(12) United States Patent
Zeng

(10) Patent No.: US 8,254,569 B2
(45) Date of Patent: Aug. 28, 2012

(54) PROVABLE DATA INTEGRITY VERIFYING METHOD, APPARATUSES AND SYSTEM

(75) Inventor: Ke Zeng, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 850 days.

(21) Appl. No.: 12/345,348

(22) Filed: Dec. 29, 2008

(65) Prior Publication Data

US 2009/0171878 A1 Jul. 2, 2009

(30) Foreign Application Priority Data

Dec. 29, 2007 (CN) .......................... 2007 1 0308148
Sep. 25, 2008 (CN) .......................... 2008 1 0165864

(51) Int. Cl.
*H04K 1/00* (2006.01)
(52) U.S. Cl. ............ 380/28; 380/44; 709/229; 713/170; 706/46
(58) Field of Classification Search .................... 380/28, 380/44; 706/46; 709/229; 713/170
See application file for complete search history.

(56) References Cited

U.S. PATENT DOCUMENTS 5,530,757 A * 6/1996 Krawczyk ...................... 713/188
7,124,190 B1 * 10/2006 Moore .......................... 709/229
2004/0064700 A1 * 4/2004 Kim et al. ...................... 713/170

OTHER PUBLICATIONS

Large-Scale Malware Analysis, Detection, and Signature Generation by Hu, Xin, Ph.D., University of Michigan, 2011, 190 pages.*
A Variational Formulation for Fingerprint Orientation Modeling; Zujun Hou; Wei-Yun Yau.;Pattern Recognition (ICPR), 2010 20th International Conference on (1051-4651) (978-1-4244-7542-1);2010. p. 1626-1629.*
A Japanese Office Action dated Aug. 26, 2011 in counterpart Japanese patent application No. 2008324039.
"Amazon Simple Storage Service (Amazon S3)," pp. 1-3, http://aws.amazon.com/s3.
"MediaMax Free Online Storage," http://www.mediamax.com.
"Gmail Drive Shell Extension," pp. 1-2, http://www.viksoe.dk/code/gmail.htm.
Wallace, C., et al., "Long-Term Archive Service Requirements," Mar. 2007, pp. 1-17, IETF Network Working Group, http://www.ietf.org/rfc/rfc4810.txt.
Deswarte, Y., et al., "Remote Integrity Checking," In Proc. of Conference on Integrity and Internal Control in Information Systems, 2003, pp. 1-11 (IICIS).
Filho, D.L.G., et al., "Demonstrating Data Possession and Uncheatable Data Transfer," pp. 1-9, http://eprint.iacr.org/2006/150.pdf.
Ateniese, G., et al., "Provable Data Possession at Untrusted Stores," pp. 1-25, http://eprint.iacr.org/2007/202.pdf.
Shacham, H., et al., "Compact Proofs of Retrievability," Feb. 17, 2008, pp. 1-31.

* cited by examiner

*Primary Examiner* — Taghi Arani
*Assistant Examiner* — Angela Holmes
(74) *Attorney, Agent, or Firm* — Sughrue Mion, PLLC

(57) ABSTRACT

The present invention proposes a Provable Data Integrity (PDI) verifying method, in which data are firstly fingerprinted at a client, and the fingerprints are sent to an archive along with the data; when necessary, the client sends a "challenge" to the archive so as to determine the integrity of the data, and the archive proves the integrity of the data by using the received fingerprints; and finally, the client verifies the integrity of the data based on the output from the archive in response to the "challenge".

56 Claims, 13 Drawing Sheets

PROVABLE DATA INTEGRITY VERIFYING METHOD, APPARATUSES AND SYSTEM

BACKGROUND OF THE INVENTION

1. Field of Invention

The present invention relates to the field of storage network security, and more particularly, to a Provable Data Integrity (PDI) verifying method, apparatuses and system.

2. Description of Prior Art

The Internet is fast evolving toward outsourcing data from one's local storage to global-scale persistent storage service. The Amazon Simple Storage Service (Amazon S3) (Reference 1: *Amazon Simple Storage Service* (Amazon S3), http://aws.amazon.com/s3) is one of such storage system for the Internet. Amazon S3 provides web services interface that can be used to store and retrieve data. The service of Amazon S3 is global-scale and business-class while its pricing is quite reasonable, US $0.15 per GB/Month of storage used, US $0.10 per GB for all data transfer in, and US $0.18 per GB for the first 10 TB/month data transfer out. In case someone is seeking for free global-scale storage service, there are as well. MediaMax (Reference 2: *MediaMax Free Online Storage*, http://www.mediamax.com) is providing 25 GB free online storage and the Gmail File System (Reference 3: *Gmail Drive Shell Extension*, http://www.viksoe.dk/code/gmail.htm) project has translated free Gmail accounts into one consistent free network storage space.

With these public storage space services, a client can discard its local storage subsystem and can retrieve data at any time and from anywhere over the Internet. This fabulous prospect has attracted lots of industry efforts and such efforts have made storage outsourcing an inevitable trend.

The IETF Network WG captured the trend and RFC 4810 "Long-Term Archive Service Requirement" was thus released (Reference 4: RFC 4810, *Long-Term Archive Service Requirement*, IETF Network WG. http://www.ieff.org/rfc/rfc4810.txt). RFC 4810 depicts requirements on a long-term archive service that is responsible for preserving data for long periods. Supporting non-repudiation of data existence, integrity, and origin is a primary purpose of a long-term archive service. As RFC 4810 stated, a long-term archive service must be capable of providing evidence that can be used to demonstrate the integrity of data for which it is responsible, from the time it received the data until the expiration of archival period of the data.

Outsourcing data from client storage to archive service has two fundamental steps, one is submitting data and the other is retrieving data. The naïve solution to verify data integrity involves retrieving the data from the archive. However, provision of high bandwidth from remote archive to the client verifier is impractical at present and in the near future as well. In particular, it's hard for a mobile client to enjoy high bandwidth connection. Moreover, as RFC 4810 stated, it may be a third-party verifier that checks integrity of user data. In such case, the third-party verifier should not have access to the user data; otherwise it may violate the user data privacy. In order to verity data integrity while avoid retrieving the data from the archive, prior work adopts an operation model of three steps, as illustrated in FIG. 1. Notice that for notational simplicity (and without loss of generality), hereafter we mostly take the case that the client, i.e. the data owner, is the user data integrity verifier as example. But as discussed before, the verifier in practice may be a third party other than the data owner.

At step 0, digital fingerprints of data are generated by the client and are sent to the archive along with the data. The archive needs to store the fingerprints of the data in addition to the data itself. At step 1 the client sends challenge on data integrity to the archive. And the archive utilizes the content of the data, the fingerprints of the data, and the client challenge all together to compute data integrity proof that is returned to the client for verification at step 2. Step 1 and step 2 may be repeated multiple times until the expiration of the archival period of the data.

Based on above operation model, below is a list of the key factors that should be considered by any technical solution to the provable data integrity issue.

(I). The time it takes for the client to generate the fingerprint of data
(II). The size of the archive storage that the fingerprint of data consumes
(III). The size of the challenge that the verifier sends to the archive
(IV). The time for the archive to compute the data integrity proof
(V). The size of the data integrity proof that the archive sends to the verifier
(VI). The time for the verifier to check the data integrity proof There is a solution seemingly tackles the data integrity issue. Initially, the data owner divides the data into multiple fragments and for each fragment pre-computes a message authentication code (MAC). Whenever a verifier, the data owner or a third party, needs data integrity proof, it retrieves from the archive service a number of randomly selected fragments and re-computes the MAC of each fragment for comparison.

Deswarte et al. (Reference 5: Y. Deswarte, J. J. Quisquater, A. Saidane, *Remote integrity checking*, In Proc. of Conference on Integrity and Internal control in Information systems (IICIS'03), 2003) and Filho et al. (Reference 6: D. L. G. Filho, P. S. L. M. Baretto. *Demonstrating Data Possession and Uncheatable Data Transfer*. http://eprint.iacr.org/2006/150.pdf) proposed to verify that an archive correctly stores a file using RSA-based hash function.

Most recently, Ateniese et al. (Reference 7: G. Ateniese, R. Burns, R. Curtmola, J. Herring, L. Kissner, Z. Peterson, D. Song, *Provable Data Possession at Untrusted Stores*. http://eprint.iacr.org/2007/202.pdf) proposed a RSA-based provable data possession scheme, S-PDP scheme, where "S" stands for "sampling". By sampling it means that the client selects a portion of the data at random and asks the archive to demonstrate evidence that the randomly selected data is in healthy status, i.e. data integrity of those selected is held. The S-PDP scheme doesn't require exponentiate the entire file and the communication complexity is constant which makes S-PDP scheme the most efficient one among all prior arts.

The naïve solution has drawback in that its communication complexity is linear with respect to the queried data size. Moreover, in the case of a third-party verifier, sending user data to the verifier is prohibitive because it violates the data owner's privacy. To avoid retrieving data from the archive service, one may improve the simple solution by choosing multiple secret keys and pre-computing multiple keyed-hash MAC for the data. Thus the verifier can each time reveal a secret key to the archive service and ask for a fresh keyed-hash MAC for comparison. However, this way the number a particular data can be verified is limited by the number of secret keys that has to be fixed a priori. When the keys are exhausted, in order to compute new MACs, retrieving the data from the archive service is inevitable.

The proposals of References 5 and 6 have drawback in that the archive has to exponentiate the entire file. As reference, given 2048-bit RSA modulus, one full exponent exponentiation takes 61.325 milliseconds on Intel Core Duo 2.16 GHz processor. Therefore it would take 251.3 seconds per Megabyte for exponentiation which means that to test integrity of 64 MB file, the archive has to spend 16083.8 seconds before the client can receive the data integrity proof.

The S-PDP scheme has one problem in that its design goal, i.e. sampling, may sometimes be meaningless to the data owner. By sampling, the S-PDP scheme tries to tolerate file block failure at seemingly high detection probability. For example, Reference 7 discusses how to reach detection probability of 99% in the case of 1% file blocks failure. However, there are many types of files that cannot withstand even one bit error. For example, loss of the head of a media file, where codec configuration parameters resides, will cause difficulty in rendering. For another example, damage on the (public key encrypted) symmetric encryption key that is embedded in an encrypted file results in garbage ciphertext that no one can recover the plaintext anymore. In general, what the data owner demands is 100% data safety. There is no compromise for whatever reasons. The S-PDP scheme has another problem in that it is extremely inefficient for being adopted by a third-party verification (or so-called public verifiability) system. In order to be publicly verifiable, the S-PDP scheme mandates that each file block must be smaller than the RSA public key e. Take 2048 bits RSA modulus as an example. The public key e can be at most 1024 bits. Hence, a solution according to the publicly verifiable S-PDP scheme has to logically divide a file into multiple 1024 bits file blocks. The consequence is a huge amount of file blocks, for each of which there must be a tag being generated. In other words, the size of the tags is two times larger than the file itself and the time it costs the client to tag a file is too much to be practically doable.

SUMMARY OF THE INVENTION

In view of above disadvantages in the prior arts, the present invention proposes the Provable Data Integrity (PDI) verifying method, in which data are firstly fingerprinted at a client, and the fingerprints are sent to an archive along with the data; when necessary, the client or the third-party verifier sends a "challenge" to the archive so as to determine the integrity of the data, and the archive proves the integrity of the data by using the received fingerprints; and finally, the client verifies the integrity of the data based on the output from the archive in response to the "challenge".

According to a first aspect of the present invention, there is provided a method of fingerprinting data, which comprises steps of: dividing the data into N blocks $M_i$, $i=1, 2, \ldots, N$; combining each of $n_B$ blocks into a super block to obtain $n=\lceil N/n_B \rceil$ super blocks; selecting $n_B$ elements $h_j$, $j=1, 2, \ldots, n_B$, from a finite cyclic group $\mathbb{G}_1=\langle g_1 \rangle$; generating a fingerprint $T_k$ for the $k^{th}$ super block respectively, $k=1, 2, \ldots, n$, by using a locator $W_k$ for the $k^{th}$ super block, the selected $n_B$ elements $h_j$ and a first private key $\chi$.

Preferably, the $n_B$ elements $h_j$ are parts of a public key corresponding to the first private key $\chi$.

Preferably, the $n_B$ elements $h_j$ satisfy a relation of $h_j=g_1^{r_j}$, where $r_j$ are secret keys.

Preferably, the fingerprint $T_k$ for the $k^{th}$ super block is generated according to $$T_k = \left( W_k \cdot \prod_{j=1}^{n_B} h_j^{M_{(k-1)*n_B+j}} \right)^{\frac{1}{x+z_M}}$$

in which $z_M$ is an identifier for the data. More preferably, the locator $W_k$ for the $k^{th}$ super block is a hash value taking at least k as an input.

Preferably, the fingerprint $T_k$ for the $k^{th}$ super block is generated according to $$T_k = \left( W_k \cdot \prod_{j=1}^{n_B} h_j^{M_{(k-1)*n_B+j}} \right)^{x}.$$

More preferably, the locator $W_k$ for the $k^{th}$ super block is a hash value taking at least k and an identifier $z_M$ for the data as inputs.

According to a second aspect of the present invention, there is provided a method of proving data integrity for data fingerprinted by the method of fingerprinting data according to the first aspect of the present invention, which comprises steps of: receiving a challenge comprising at least a first randomness defining key $\kappa_1$ and a second randomness defining key $\kappa_2$; constructing $\Phi$ boxes; randomly assigning the n fingerprints into the $\Phi$ boxes in a first random manner defined by the first randomness defining key $\kappa_1$, each fingerprint being put into one box; generating $\Phi$ packed super blocks and corresponding packed fingerprints based on the above assignment of the n fingerprints; randomly transforming the $\Phi$ packed super blocks and corresponding packed fingerprints in a second random manner defined by the second randomness defining key $\kappa_2$ to generate a transformed super block and a transformed fingerprint; generating a knowledge proof of the transformed super block.

Preferably, the knowledge proof of the transformed super block is the transformed super block itself.

Preferably, the knowledge proof of the transformed super block is generated based on the public key and the transformed super block. More preferably, the knowledge proof of the transformed super block H is represented as $$H = \prod_{j=1}^{n_B} H_j^{E_j}$$

in which $H_j=h_j^\theta$, where $\theta$ is a second private key, and $E_j$ is the transformed super block. Alternatively, the knowledge proof of the transformed super block H is represented as $$H = prf_5\left( \prod_{j=1}^{n_B} H_j^{E_j} \right)$$

in which $H_j=h_j^\theta$, where $\theta$ is a second private key, $E_j$ is the transformed super block, and $prf_5(\bullet)$ denotes a pseudo random function.

Preferably, the challenge further comprises a super block selecting key pair $(\kappa_3, \Lambda)$ to define which $\Lambda$ super blocks and corresponding fingerprints, instead of all the n super blocks and corresponding fingerprints, will be selected for data integrity proving.

Preferably, the challenge further comprises a repetition factor $\psi$, and the steps from the box constructing to the knowledge proof generating are repeated the $\psi$ times, each time generates one knowledge proof of the transformed super block which is denoted as an $m^{th}$ knowledge proof of the transformed super block $H_m$, $m=1, 2, \ldots, \psi$. More preferably, the number of $\Phi$ equals to $2^{\phi}$, where $\phi=\lceil l+\psi \rceil+1$, and l is a security level factor that determines the security level of the method.

Preferably, the first and second randomness defining keys $\kappa_1$ and $\kappa_2$ and the super block selecting key pair $(\kappa_3, \Lambda)$ are selected by a verifier.

Preferably, the challenge contains a digitally signed time stamp from a Time Stamping Authority (TSA). More preferably, at least one of the first and second randomness defining keys $\kappa_1$ and $\kappa_2$ and the super block selecting key $\kappa_3$ is generated from the digitally signed time stamp.

Preferably, the method of proving data integrity further comprises: sending the transformed fingerprint(s) and the knowledge proof(s) of the transformed super block(s).

According to a third aspect of the present invention, there is provided a method of verifying data integrity for data fingerprinted by the method of fingerprinting data according to the first aspect of the present invention in connection with the method of proving data integrity according to the second aspect of the present invention, which comprises steps of: generating and sending a challenge comprising at least a first randomness defining key $\kappa_1$ and a second randomness defining key $\kappa_2$; receiving a transformed fingerprint and a knowledge proof of the transformed super block; constructing $\Phi$ boxes; randomly assigning the n locators $W_k$ into the $\Phi$ boxes in the first random manner, each locator being put into one box; generating $\Phi$ packed locators based on the above assignment of the n locators; randomly transforming the $\Phi$ packed locators in the second random manner to generate a transformed locator; generating an alleged knowledge proof of the transformed super block from the transformed fingerprint and the transformed locator; comparing the alleged knowledge proof of the transformed super block with the received knowledge proof of the transformed super block; verifying the data integrity for the data if the comparison result is positive.

Preferably, the alleged knowledge proof of the transformed super block is generated based on the identifier $z_M$ for the data, the transformed fingerprint and the transformed locator.

More preferably, the alleged knowledge proof of the transformed super block is generated further based on the first and second private keys $\chi$ and $\theta$. More preferably, the alleged knowledge proof of the transformed super block is represented as $prf_5((T^{1/\chi} \cdot W)^\theta)$, where T denotes the transformed fingerprint, and W denotes the transformed locator; and the locator $W_k$ for the $k^{th}$ super block is a hash value taking at least k and the identifier $z_M$ for the data as inputs. Alternatively, the alleged knowledge proof of the transformed super block is represented as $prf_5((T^{\chi+z_M} \cdot W)^\theta)$, where T denotes the transformed fingerprint, and W denotes the transformed locator; and the locator $W_k$ for the $k^{th}$ super block is a hash value taking at least k as an input.

More preferably, the alleged knowledge proof of the transformed super block is generated as $e(T, Y_\theta \cdot g_{2\theta}^{zM}) \cdot e(W, g_{2\theta})$ in which $Y_\theta = Y^\theta$, $g_{2\theta} = g_2^\theta$, $Y = g_2^\chi \in \mathbb{G}_2$; $\langle = \rangle g_2 \mathbb{G}_2$ is a finite cyclic group having an additional group $g = \langle g \rangle$ with $\mathbb{G}_1 = \langle g_1 \rangle$ such that $\mathbb{G}_1 = \mathbb{G}_2 = |G| = p$ where p is a large prime; e: $\mathbb{G}_1 \times \mathbb{G}_2 \rightarrow G$ is a bilinear map function; T denotes the transformed fingerprint; W denotes the transformed locator; the locator $W_k$ for the $k^{th}$ super block is a hash value taking at least k as an input; and $\chi$ and $\theta$ are the first and second private keys; and the alleged knowledge proof of the transformed super block is compared with the knowledge proof of the transformed super block as $$e(H, g_2) \stackrel{?}{=} e(T, Y_\theta \cdot g_{2\theta}^{zM}) \cdot e(W, g_{2\theta})$$

where H denotes the knowledge proof of the transformed super block.

More preferably, the alleged knowledge proof of the transformed super block is generated as $e(T, Y_\theta) \cdot e(W, g_{2-\theta})$ in which $Y_\theta \cdot g_2^{\theta/\chi}$, $g_{2\theta} = g_2^\theta$, $Y = g_2^\chi \in \mathbb{G}_2$; $\mathbb{G}_2 = \langle g_2 \rangle$ is a finite cyclic group having an additional group $\mathcal{G}\langle g \rangle$ with $\mathbb{G}_1 = \langle g_1 \rangle$ such that $\mathbb{G}_1 = \mathbb{G}_2 = |\mathcal{G}| = p$ where p is a large prime; e: $\mathbb{G}_1 \times \mathbb{G}_2 \rightarrow \mathcal{G}$ is a bilinear map function; T denotes the transformed fingerprint; W denotes the transformed locator; the locator $W_k$ for the $k^{th}$ super block is a hash value taking at least k and the identifier $z_M$ for the data as inputs; and $\chi$ and $\theta$ are the first and second private keys; and the alleged knowledge proof of the transformed super block is compared with the knowledge proof of the transformed super block as $$e(H, g_2) \stackrel{?}{=} e(T, Y_\theta) \cdot e(W, g_{2\theta})$$

where H denotes the knowledge proof of the transformed super block.

Preferably, the challenge further comprises a super block selecting key pair $(\kappa_3, \Lambda)$ to define which $\Lambda$ locators, instead of all the n locators, will be selected for data integrity verifying.

Preferably, the challenge further comprises a repetition factor $\psi$, and the steps from the box constructing to the comparison of knowledge proof and alleged knowledge proof are repeated the $\psi$ times, and only if all the comparison results are positive, the data integrity for the data is verified.

Preferably, the first and second randomness defining keys $\kappa_1$ and $\kappa_2$ and the super block selecting key pair $(\kappa_3, \Lambda)$ are selected by a verifier.

Preferably, the challenge contains a digitally signed time stamp from a Time Stamping Authority (TSA). More preferably, at least one of the first and second randomness defining keys $\kappa_1$ and $\kappa_2$ and the super block selecting key $\kappa_3$ is generated from the digitally signed time stamp.

According to a fourth aspect of the present invention, there is provided an apparatus for fingerprinting data, which comprises: a super block generating unit for dividing the data into N blocks $M_i$, $i=1, 2, \ldots, N$, and combining each of $n_B$ blocks into a super block to obtain $n = \lceil N/n_B \rceil$ super blocks; and a fingerprinting unit for selecting $n_B$ elements $h_j$, $j=1, 2, \ldots, n_B$ from a finite cyclic group $\mathbb{G}_1 = \langle g_1 \rangle$, and generating a fingerprint $T_k$ for the $k^{th}$ super block respectively, $k=1, 2, \ldots, n$, by using a locator $W_k$ for the $k^{th}$ super block, the selected $n_B$ elements $h_j$ and a first private key $\chi$.

Preferably, the $n_B$ elements $h_j$ are parts of a public key corresponding to the first private key $\chi$.

Preferably, the $n_B$ elements $h_j$ satisfy a relation of $h_j = g_1^{r_j}$, where $r_j$ are secret keys.

According to a fifth aspect of the present invention, there is provided an apparatus for proving data integrity, which comprises: a receiving unit for receiving a challenge comprising at least a first randomness defining key $\kappa_1$ and a second randomness defining key $\kappa_2$; a packaging unit for constructing Φ boxes, randomly assigning the n fingerprints into the Φ boxes in a first random manner defined by the first randomness defining key $\kappa_1$, each fingerprint being put into one box, and generating Φ packed super blocks and corresponding packed fingerprints based on the above assignment of the n fingerprints; a transforming unit for randomly transforming the Φ packed super blocks and corresponding packed fingerprints in a second random manner defined by the second randomness defining key $\kappa_2$ to generate a transformed super block and a transformed fingerprint; and a knowledge proof generating unit for generating a knowledge proof of the transformed super block.

Preferably, the knowledge proof generating unit generates the knowledge proof of the transformed super block as the transformed super block itself.

Preferably, the knowledge proof generating unit generates the knowledge proof of the transformed super block based on the public key and the transformed super block.

Preferably, the challenge further comprises a super block selecting key pair ($\kappa_3$,Λ) to define which Λ super blocks and corresponding fingerprints, instead of all the n super blocks and corresponding fingerprints, will be selected by the packaging unit for data integrity proving.

Preferably, the challenge further comprises a repetition factor ψ, and the operations of the packaging unit, the transforming unit and the knowledge proof generating unit are repeated the ψ times, each time generate one knowledge proof of the transformed super block which is denoted as an $m^{th}$ knowledge proof of the transformed super block $H_m$, m=1, 2, ..., ψ.

Preferably, the challenge contains a digitally signed time stamp from a Time Stamping Authority (TSA). More preferably, at least one of the first and second randomness defining keys $\kappa_1$ and $\kappa_2$ and the super block selecting key $\kappa_3$ is generated from the digitally signed time stamp.

Preferably, the apparatus for proving data integrity further comprises: a sending unit for sending the transformed fingerprint(s) and the knowledge proof(s) of the transformed super block(s).

According to a sixth aspect of the present invention, there is provided an apparatus for verifying data integrity, which comprises: a challenge generating and sending unit for generating and sending a challenge comprising at least a first randomness defining key $\kappa_1$ and a second randomness defining key $\kappa_2$; a receiving unit for receiving a transformed fingerprint and a knowledge proof of the transformed super block; a locator packaging unit for constructing Φ boxes, randomly assigning the n locators $W_k$ into the Φ boxes in the first random manner, each locator being put into one box, and generating Φ packed locators based on the above assignment of the n locators; an alleged knowledge proof generating unit for randomly transforming the Φ packed locators in the second random manner to generate a transformed locator, and generating an alleged knowledge proof of the transformed super block from the transformed fingerprint and the transformed locator; a comparator for comparing the alleged knowledge proof of the transformed super block with the received knowledge proof of the transformed super block; and a verifying unit for verifying the data integrity if the comparison result is positive.

Preferably, the alleged knowledge proof generating unit generates the alleged knowledge proof of the transformed super block based on the identifier $z_M$ for the data, the transformed fingerprint and the transformed locator. More preferably, the alleged knowledge proof generating unit generates the alleged knowledge proof of the transformed super block further based on first and second private key χ and θ.

Preferably, the challenge generated by the challenge generating and sending unit further comprises a super block selecting key pair ($\kappa_3$,Λ) to define which Λ locators, instead of all the n locators, will be selected by the locator packaging unit for data integrity verifying.

Preferably, the challenge generated by the challenge generating and sending unit further comprises a repetition factor ψ, and the operations of the locator packaging unit, the alleged knowledge proof generating unit and the comparator are repeated the ψ times, and only if all the comparison results are positive, the verifying unit verifies the data integrity.

Preferably, the challenge generated by the challenge generating and sending unit contains a digitally signed time stamp from a Time Stamping Authority (TSA). More preferably, the challenge generating and sending unit determines at least one of the first and second randomness defining keys $\kappa_1$ and $\kappa_2$ and the super block selecting key $\kappa_3$ from the digitally signed time stamp.

According to a seventh aspect of the present invention, there is provided a data integrity verifying system, which comprises: the apparatus for proving data integrity according to the fifth aspect of the present invention; and the apparatus for verifying data integrity according to the sixth aspect of the present invention.

Preferably, the data integrity verifying system further comprises: the apparatus for fingerprinting data according to the fourth aspect of the present invention. More preferably, the apparatus for fingerprinting data is also used as the apparatus for verifying data integrity.

The inventive PDI scheme can ensure data integrity of the data at overwhelming probability, for instance $1-2^{-64}$. Compared to prior arts that achieve (1) data integrity is ensured on each bit of the data, (2) the size of the challenge that the client sends to the archive is constant, and (3) the size of the data integrity proof that the archive sends to the client is constant, the inventive PDI scheme has following four main advantages.

(I). The speed that the client generates the fingerprint of data is the fastest (II). The speed that the archive generates response to the client challenge is the fastest (III). The speed that the client verifies the archive's response is the fastest (IV). The verifier may be a third-party verifier, and all above three advantages (I)-(III) can be also achieved. Moreover, the size of the fingerprints is the smallest Take a 64 M bytes data file as a concrete example. The security strength is set to 2048-bit RSA signature comparable and l=64. Given Intel Core Duo 2.16 GHz processor for the client and Intel Qx6700 Core2 Quad 2.66 GHz processor for the archive, with PDI scheme the client spends about 12.7 seconds to fingerprint the file; the archive spends about 1.4 seconds to generate the transformed fingerprint and the knowledge proof of transformed super block; and the client spends about 0.4 second to verify the knowledge proof. All these timing values are even lower than the theoretic lower bounds that prior RSA based schemes can at best achieve.

BRIEF DESCRIPTION OF THE DRAWINGS

The above and other objects, features and advantages of the present invention will be clearer from the following detailed description about the non-limited embodiments of the present invention taken in conjunction with the accompanied drawings, in which.

DETAILED DESCRIPTION OF PREFERRED EMBODIMENTS

Hereunder, the present invention will be described in accordance with the drawings. In the following description, some particular embodiments are used for the purpose of description only, which shall not be understood as any limitation to the present invention but the examples thereof. While it may blur the understanding of the present invention, the conventional structure or construction will be omitted.

Principle Description

The Provable Data Integrity (PDI) scheme is herein presented that not only overcomes all the problems prior arts encountered but also outperforms all the prior arts.

Figure 1:
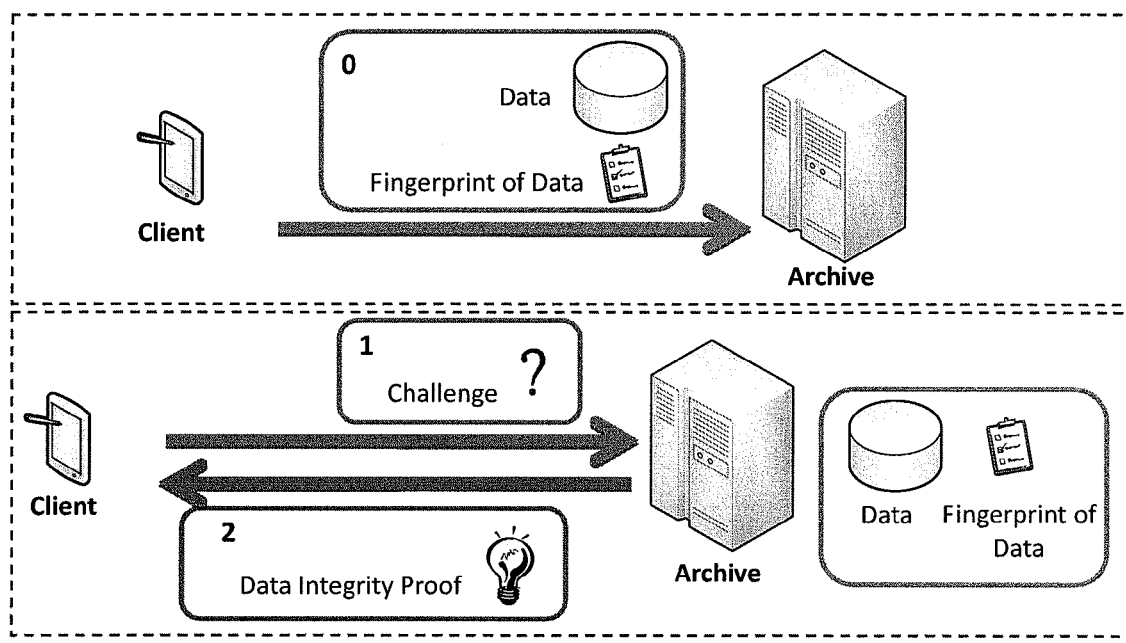
FIG. 1 shows an operation model for proving data integrity.
Figure 2:
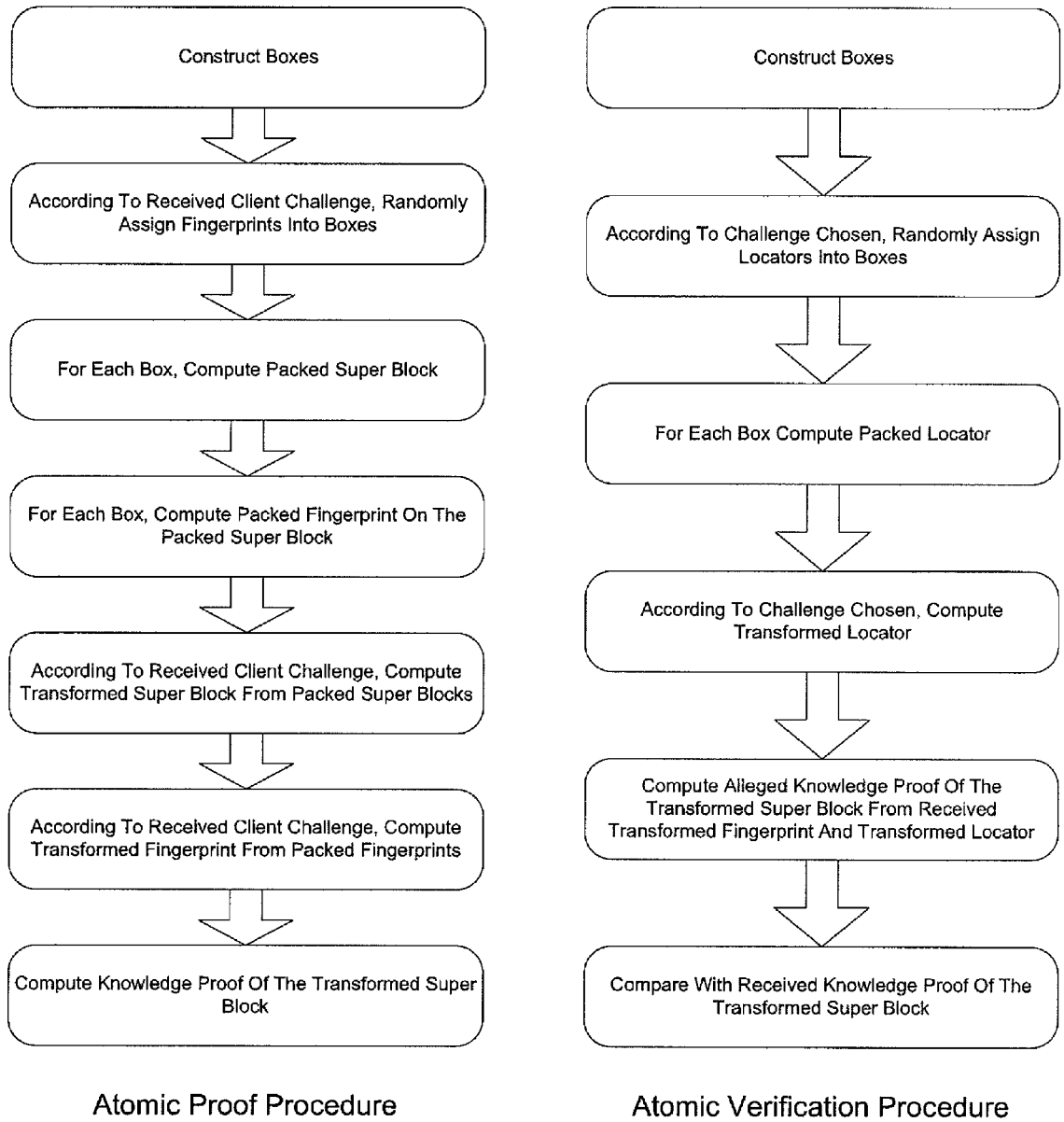
FIG. 2 shows the flow charts for the method of proving data integrity (Atomic Proof Procedure) and the method of verifying data integrity (Atomic Verification Procedure) according to the present invention.

Basically, the PDI scheme has below three steps that comply with operation model illustrated in FIG. 1.

Step 0':

The PDI scheme requires a finite cyclic group $\mathbb{G}_1 = \langle g_1 \rangle$. Preferably, $\mathbb{G}_1$ is a finite cyclic group over elliptic curve. Throughout this invention disclosure, we use traditional multiplicative group notation, instead of the additive notation often used in elliptic curve settings. The client has a private key $\chi$ and a corresponding public key.

The client divides the data file into N blocks $M_i$, i=1, 2, ..., N. Each $n_B$ blocks are combined together as a super block. Therefore, the data is divided into $n = \lceil N/n_B \rceil$ super blocks. If the length of the data file is less than that n super blocks require, the data file will be logically padded with zero.

For each data file the client prepares $n_B$ elements $h_i$ of $\mathbb{G}_1$, i=1, 2, ..., $n_B$. In the preferable case, the client selects $r_i$ such that $h_i = g_1^{r_i}$ and keeps $r_i$ secret. More preferably, the elements $h_i$ are part of the client's public key thus being independent of the data file.

The client utilizes his private key and the above $n_B$ elements $h_i$ to generate fingerprints for all the super blocks. For example, fingerprint of the ith super block is of the form $$T_i = \left( W_i \cdot \prod_{j=1}^{n_B} h_j^{M_{(i-1)*n_B+j}} \right)^{\frac{1}{x+z_M}},$$

where the locator $W_i$ is a hash value that takes at least i as input, e.g. it may take the data file's file name and/or version number as additional input; and $z_M$ is an identifier specifically chosen for the data file, e.g. one identifier $z_M$ may be chosen for a set of data files while another identifier $z_M$ is chosen for another set of data files. Alternatively, the fingerprint is computed as $$T_i = \left( W_i \cdot \prod_{j=1}^{n_B} h_j^{M_{(i-1)*n_B+j}} \right)^x,$$

where the locator $W_i$ takes i and $z_M$ as input. In the preferable case, the client knows $r_i$ such that $h_i = g^{r_i}$. Hence by replacing $$\prod_{j=1}^{n_B} h_j^{M_{(i-1)*n_B+j}} \text{ to } g_1 \sum_{j=1}^{n_B} r_j \cdot M_{(i-1)*n_B+j},$$

the client can utilize knowledge of $r_i$ to speed up fingerprinting process.

As result of Step 0', the client gets n fingerprints for n super blocks. The client sends all the fingerprints to the archive along with the data file and the $n_B$ elements $h_i$. In the preferable case that the $n_B$ elements $h_i$ are part of the client's public key, the archive may get these elements already from e.g. public key directory. Thus these elements are unnecessary to be transmitted along with the data file.

Step 1':

The client sends a "challenge" to the archive so as to determine the integrity of the data.

Based on the challenge received from the client, the archive needs to execute atomic proof procedure several, e.g. $\psi$, times.

For each atomic proof procedure, the archive first constructs $\Phi = 2^\varphi$ boxes, logically, and randomly assigns the n fingerprints into the boxes. The number $\Phi$ as well as the randomness is determined by the "challenge" received from the client. Each fingerprint must be put in one and only one box. Noting that each fingerprint exactly corresponds to one super block, after all the n fingerprints have been placed in the boxes, for each box there is a "packed super block" and a "packed fingerprint" on the "packed super block" generated based on the fingerprints that are assigned into the box. For instance, consider the case that only two fingerprints on the $\eta$th and $\omega$th super blocks are put in the $\Lambda$th box. The "packed super block" of this box contains $\hat{M}_{\lambda,j} = M_{\eta*n_B+j} + M_{\omega*n_B+j}$, j=1, 2, ..., $n_B$. And the "packed fingerprint" on the "packed super block" is $\hat{T}_\lambda = T_\eta \cdot T_\omega$.

Next, by applying another randomness to the "packed super blocks" and "packed fingerprints" of all the boxes, the archive generates one "transformed super block" and one "transformed fingerprint" on the "transformed super block". The randomness here is again determined by the "challenge" received from the client. Continue with above example, the "transformed super block" will contain $$E_j = \sum_{\lambda=1}^{\Phi} a_\lambda \cdot \hat{M}_{\lambda j}, \ j = 1, 2, \ldots, n_B$$

and the "transformed fingerprint" on the "transformed super block" is $$T = \prod_{\lambda=1}^{\Phi} \hat{T}_\lambda^{a_\lambda},$$

where $a_\lambda$ are random numbers determined by the client's "challenge".

Finally, the archive generates "knowledge proof of the transformed super block". It may be the "transformed super block" directly. Alternatively, it may be knowledge of the content of the "transformed super block" by standard interactive or non-interactive zero-knowledge proof technologies. Or alternatively, the client "challenge" contains $H_i = h_i^\theta$, $i=1, 2, \ldots, n_B$, while the client chooses different $\theta$ for each challenge and keeps $\theta$ secret. In the preferable case, $H_i$ are part of the client's public key and $\theta$ is part of the client's private key. Making use of $H_i$, the archive computes "knowledge proof of the transformed super block" as $$H = \prod_{i=1}^{n_B} H_i^{E_i}.$$

The archive needs to send the "transformed fingerprint" T and the "knowledge proof of transformed super block" H as output of the atomic proof procedure to the client.

In all, the archive should repeat the atomic proof procedures $\psi$ times. We may choose $\phi = \lceil l/\psi \rceil + 1$ that determines the number of boxes, where $l$ is chosen by the client and determines the security level. And we choose the bit length of the random number $a_\lambda$ to be $\phi$. By repeating the atomic procedures $\psi$ times, the security level of the PDI scheme can be $(n/\psi) \cdot 2^{-l}$ which means that if at least one block is damaged the archive can convince the verifier with probability at most $(n/\psi) \cdot 2^{-l}$.

Said "The number $\Phi$ as well as the randomness is determined by the challenge received from the client" and "$a_\lambda$ are random numbers determined by the client's challenge" have alternative embodiments. For instance, we may choose $\phi = n$ and assign the n fingerprints evenly into n boxes, i.e., for each box there is one and only one fingerprint. And we choose the bit length of $a_\lambda$ to be l. In this case, choosing $\psi = 1$ can achieve security level $n \cdot 2^{-l}$.

Step 2':

The client receives output of all the $\psi$ atomic proof procedures from the archive. For each "transformed fingerprint" on "transformed super block" and the "knowledge proof of transformed super block" of one atomic proof procedure, the client carries out an atomic verification procedure.

For each atomic verification procedure, the client first constructs $\Phi$ boxes, logically, and randomly assigns the locator $W_i$ into the boxes. The randomness is exactly the same as the archive used to assign fingerprints because the randomness is determined by the "challenge" that the client chose. Each locator must be put in one and only one box. After all the n locators have been placed in the boxes, for each box there is a "packed locator" generated based on the locators that are assigned into the box. For instance, consider the case that only two locators $W_\eta$ and $W_\omega$ are put in the $\lambda$th box. The "packed locator" of this box is $\hat{W}_\lambda = W_\eta \cdot W_\omega$.

Next, by applying the another randomness to the "packed locators" of all boxes, the client generates one "transformed locator". The randomness is exactly the same as the archive used to compute "transformed fingerprint" because the randomness is determined by the "challenge" that the client chose. The "transformed locator" is $$W = \prod_{\lambda=1}^{\Phi} \hat{W}_\lambda^{a_i},$$

where $a_\lambda$ are random numbers determined by the client's "challenge".

Finally, if the archive generates "knowledge proof of the transformed super block" as the "transformed super block" directly, the client computes "alleged knowledge proof of the transformed super block" as $H' = (T^{\chi + z_M}/W)$ and compares with $$\prod_{i=1}^{n_B} h_i^{E_i}.$$

Only if they are equal, the atomic verification procedure outputs success. Alternatively, the client computes "alleged knowledge proof of the transformed super block" as $H' = (T^{\chi+z_M}/W)^\theta$ and compares with the value H received from the archive. Only if $H = H'$, the atomic verification procedure outputs success. Alternatively, the "alleged knowledge proof of the transformed super block" is computed as $(T^{1/\chi}/W)^\theta$ if the fingerprint is computed as $$T_i = \left( W_i \cdot \prod_{j=1}^{n_B} h_j^{M_{(i-1)*n_B+j}} \right)^x.$$

If and only if all the atomic verification procedures output success, the client is convinced that the data integrity is kept at the archive side. In the case that at least one block is damaged at the archive side, the probability that the client is falsely convinced can at most be $2^{-l}$.

Detailed Explanation

Hereunder the present invention will be described in more details.

We use traditional multiplicative group notation, instead of the additive notation often used in elliptic curve settings.

Let $\mathbb{G}_1 = \langle g_1 \rangle$ and $\mathbb{G}_2 = \langle g_2 \rangle$ be two finite cyclic groups with additional group $\mathcal{G} = \langle g \rangle$ such that $|\mathbb{G}_1| = |\mathbb{G}_2| = |\mathcal{G}| = p$ where p is some large prime. Bilinear map e: $\mathbb{G}_1 \times \mathbb{G}_2 \to \mathcal{G}$ is a function, such that Bilinear: for all $h_1 \in \mathbb{G}_1$, $h_2 \in \mathbb{G}_2$, for all $a, b \in \mathbb{Z}_p$, $e(h_1^a, h_2^b) = e(h_1, h_2)^{ab}$ Non-degenerate: $\exists h_1 \in \mathbb{G}_1$, $\exists h_2 \in \mathbb{G}_2$ such that $e(h_1, h_2) \neq I$ where I is the identity of $\mathcal{G}$ Computable: there exists an efficient algorithm for computing e We suppose there is a setup algorithm Setup($\cdot$) that on input security parameter $1^k$, outputs above settings of bilinear map and writes this as $(p, \mathbb{G}_1, \mathbb{G}_2, \mathcal{G}, g_1, g_2, e) \leftarrow \text{Setup}(1^k)$.

Since $\mathbb{G}_1, \mathbb{G}_2$, and $\mathcal{G}$ are of the same prime order p, according to Bilinear property and Non-degenerate property it's easy to see that $e(g_1, g_2) = g$.

Given $(p, \mathbb{G}_1, \mathbb{G}_2, \mathcal{G}, g_1, g_2, e) \leftarrow \text{Setup}(1^k)$, and five pseudo random functions $\text{prf}_1: \{0,1\}^* \to \mathbb{Z}_p$, $\text{prf}_2: \{0,1\}^* \to \mathbb{G}_1$, $\text{prf}_3(\phi): \{0,1\}^* \to \mathbb{Z}_{2^\phi}$, $\text{prf}_4(\phi): \{0,1\}^* \to \mathbb{Z}_{2^\phi}$, and $\text{prf}_5: \mathbb{G}_1 \to \{0,1\}^{160}$ as system parameters.

Client Fingerprints Data

The client has secret key $$(x, \vartheta) \xleftarrow{R} \mathbb{Z}_p^2$$

and public key $Y = g_2^x \in \mathbb{G}_2$. It's preferable that the client has a certificate on Y from a certification authority. Alternatively, the client secret key $\vartheta$ may for instance be computed as $\vartheta = \text{prf}_1(\chi, \text{"second private key"})$.

In addition, the client computes $(h_i = g_1^{prf_1(i,\chi)}, H_i = h_i^\vartheta) \in \mathbb{G}_1^2$, $i = 1, 2, \ldots, n_B$ as his public keys.

Given data M that is divided into N blocks $M_i$ ($i = 1, 2, \ldots, N$) each of which is $l_M$ bits in length, where $l_M < \log p$ is a must. Denote the reference to M, e.g. its qualified file name, as $FN_M$.

Figure 3:
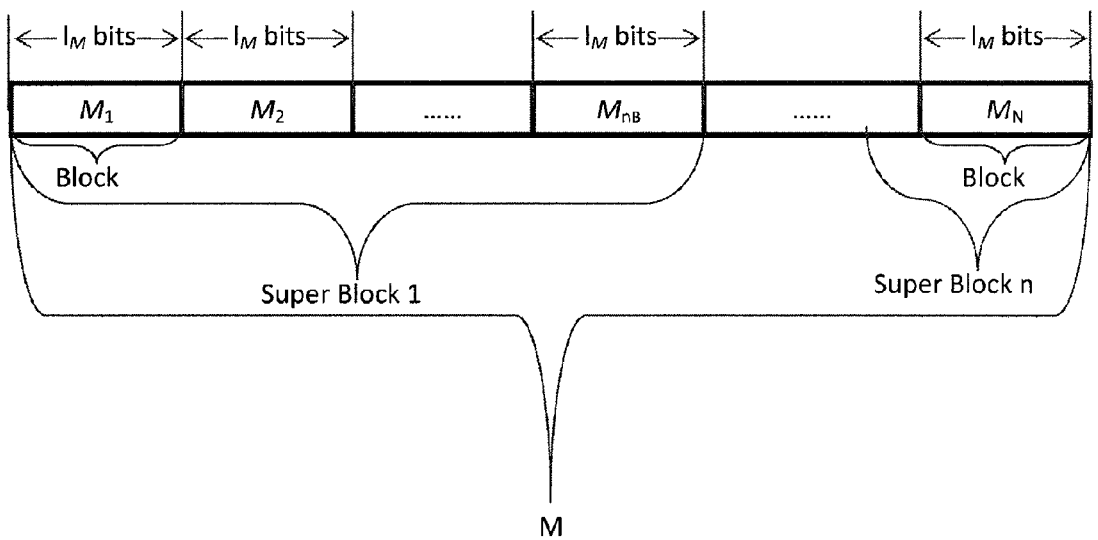
FIG. 3 is a logic view of the data.
Figure 4:
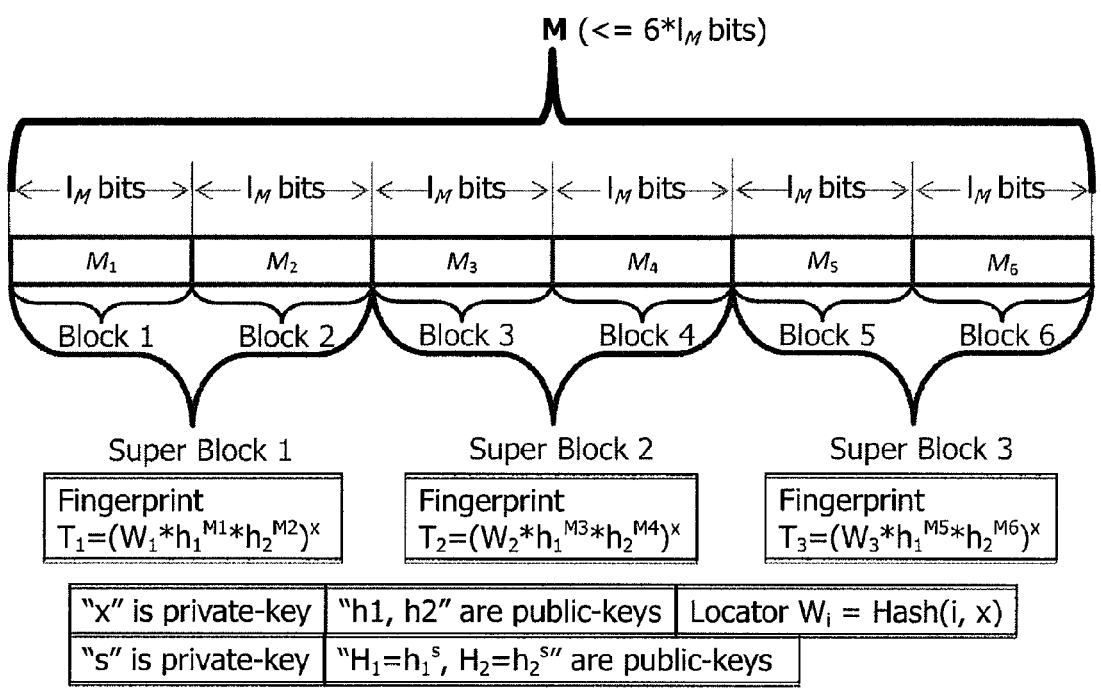
FIGS. 4-7 shows a concrete example of the present invention and its demonstration of the correctness in which 6 blocks $M_1$-$M_6$ are used and 3 super blocks are formed with $n_B$=2.
Figure 5:
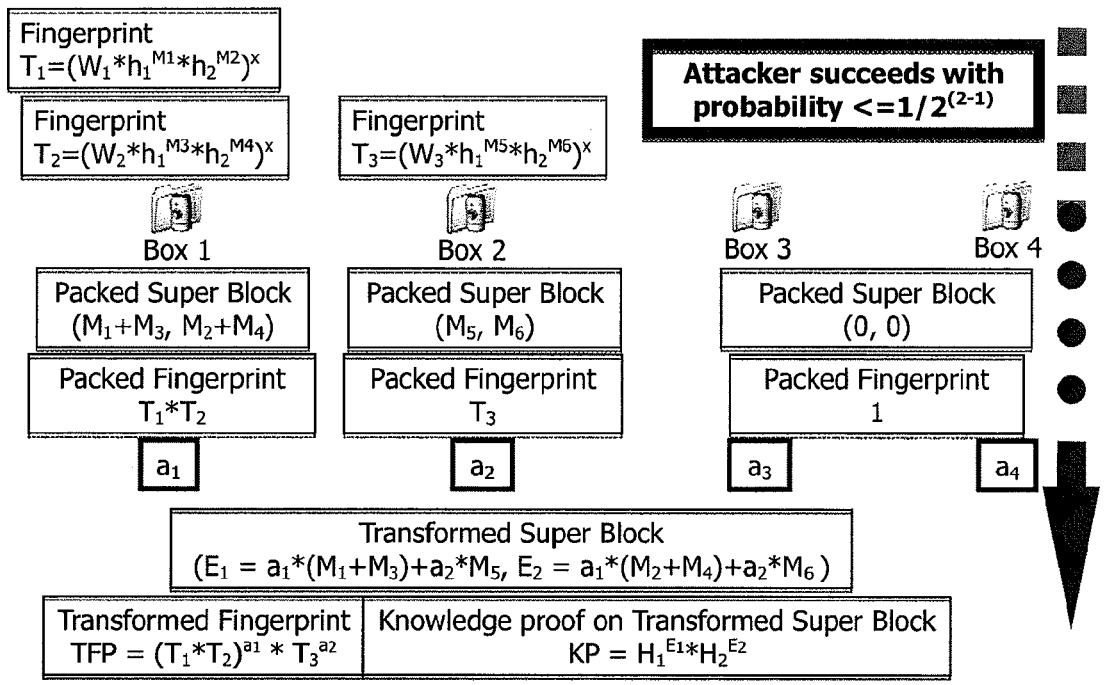
Figure 6:
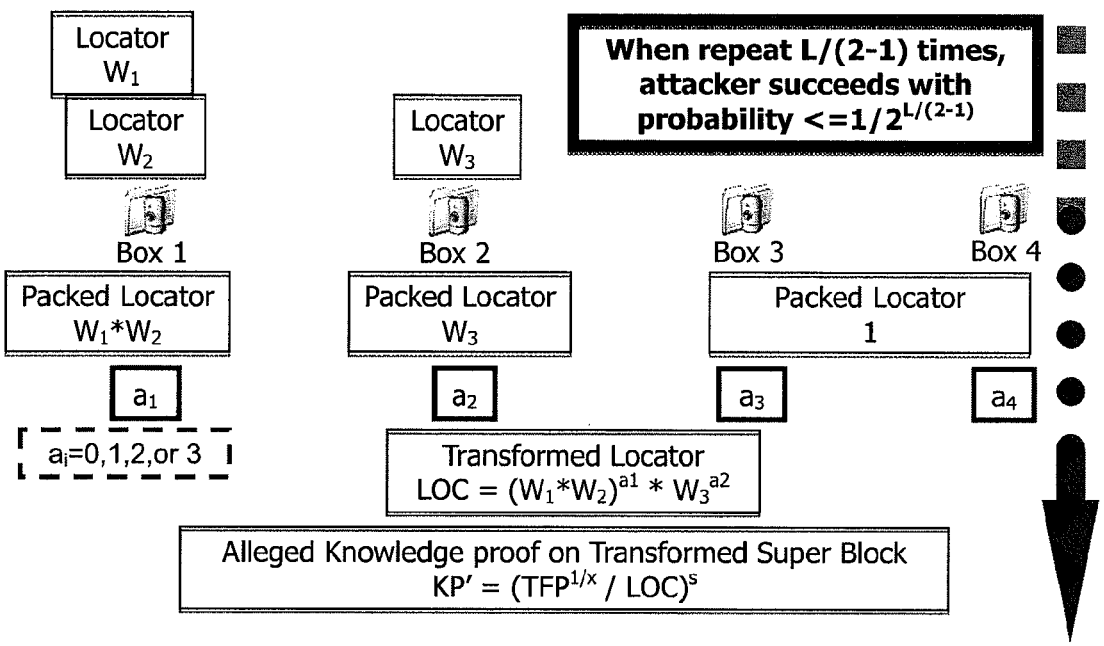
Figure 7:
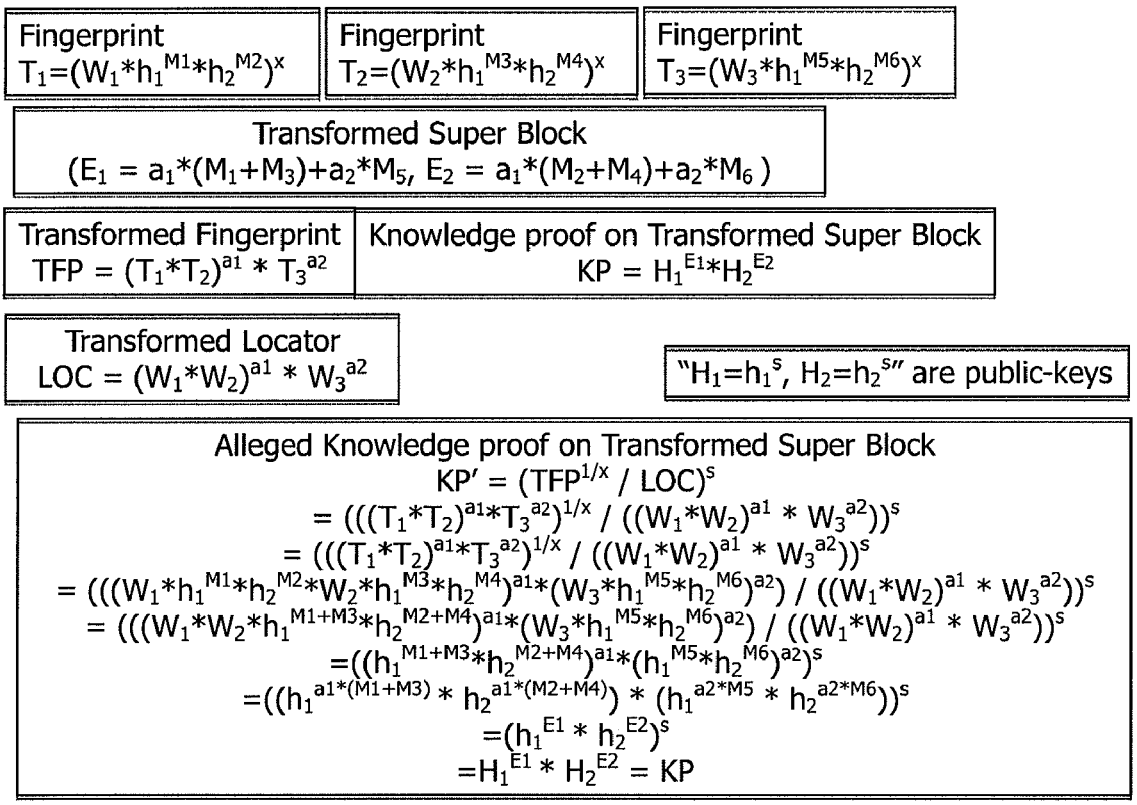
Figure 8:
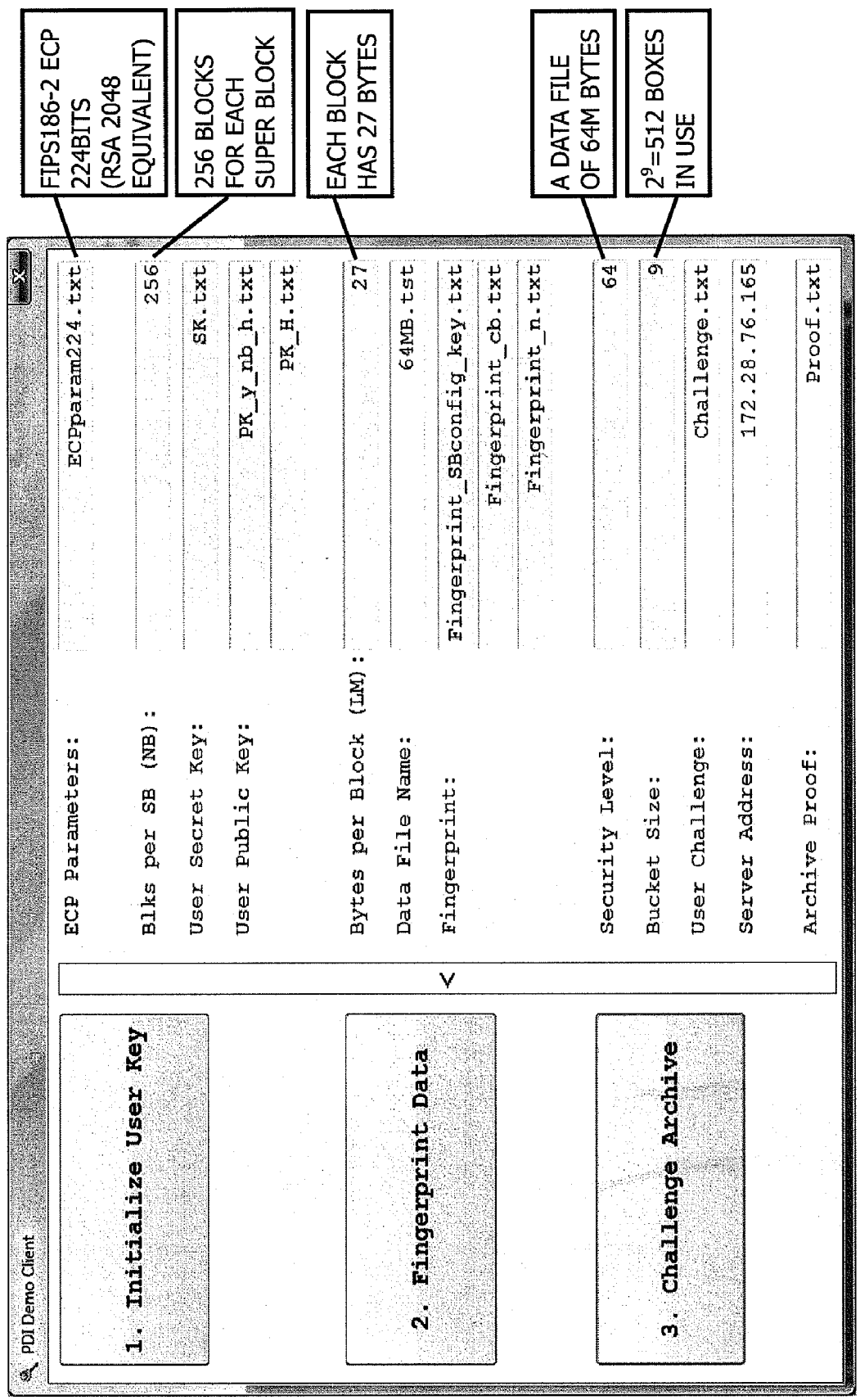
FIGS. 8-11 shows the result of the real experiment in which 256 blocks each having 27 bytes are combined into one super block, $\Phi=2^\Theta=512$ boxes are used, and the data file has a size of 64 M bytes.
Figure 9:
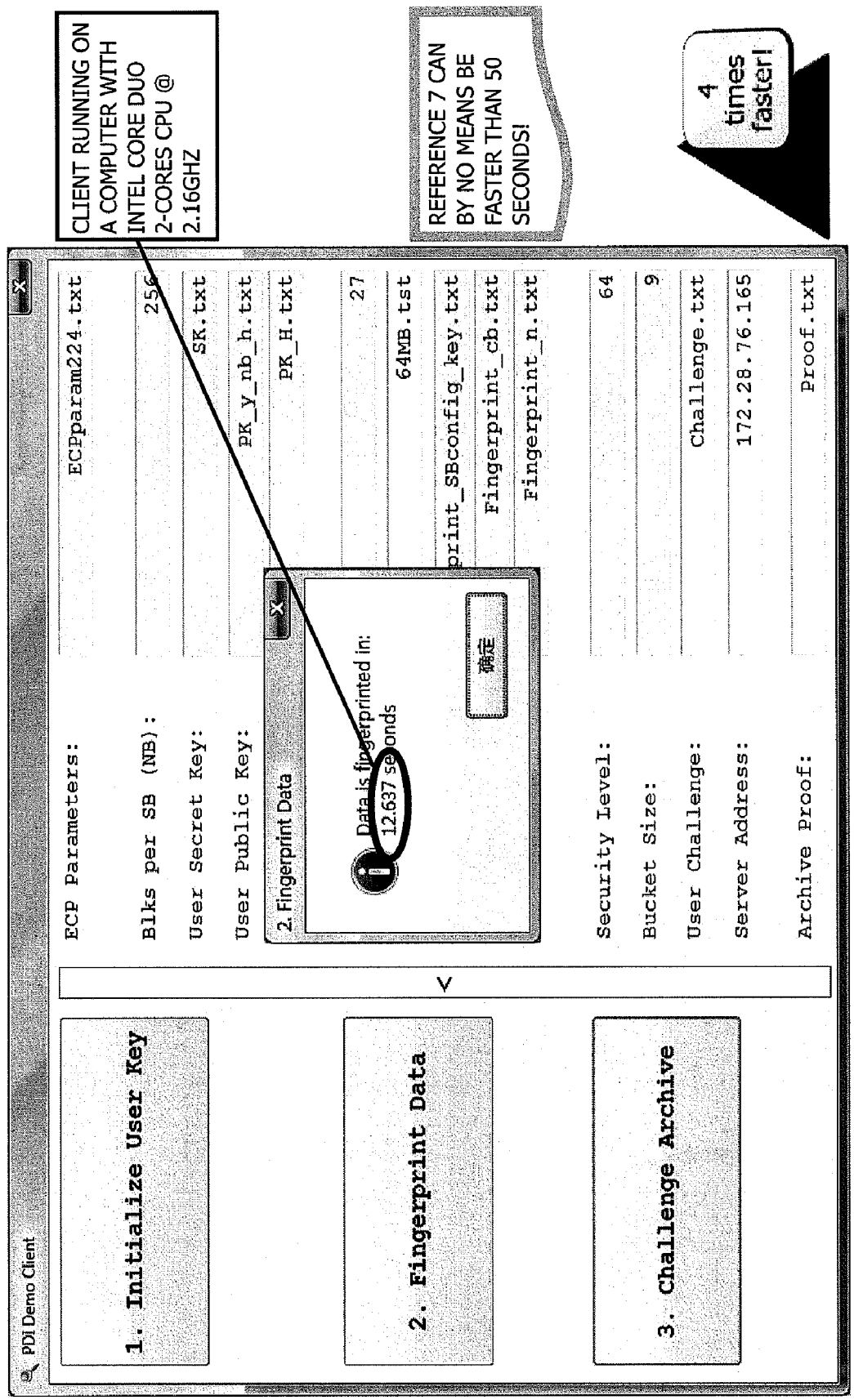
Figure 10:
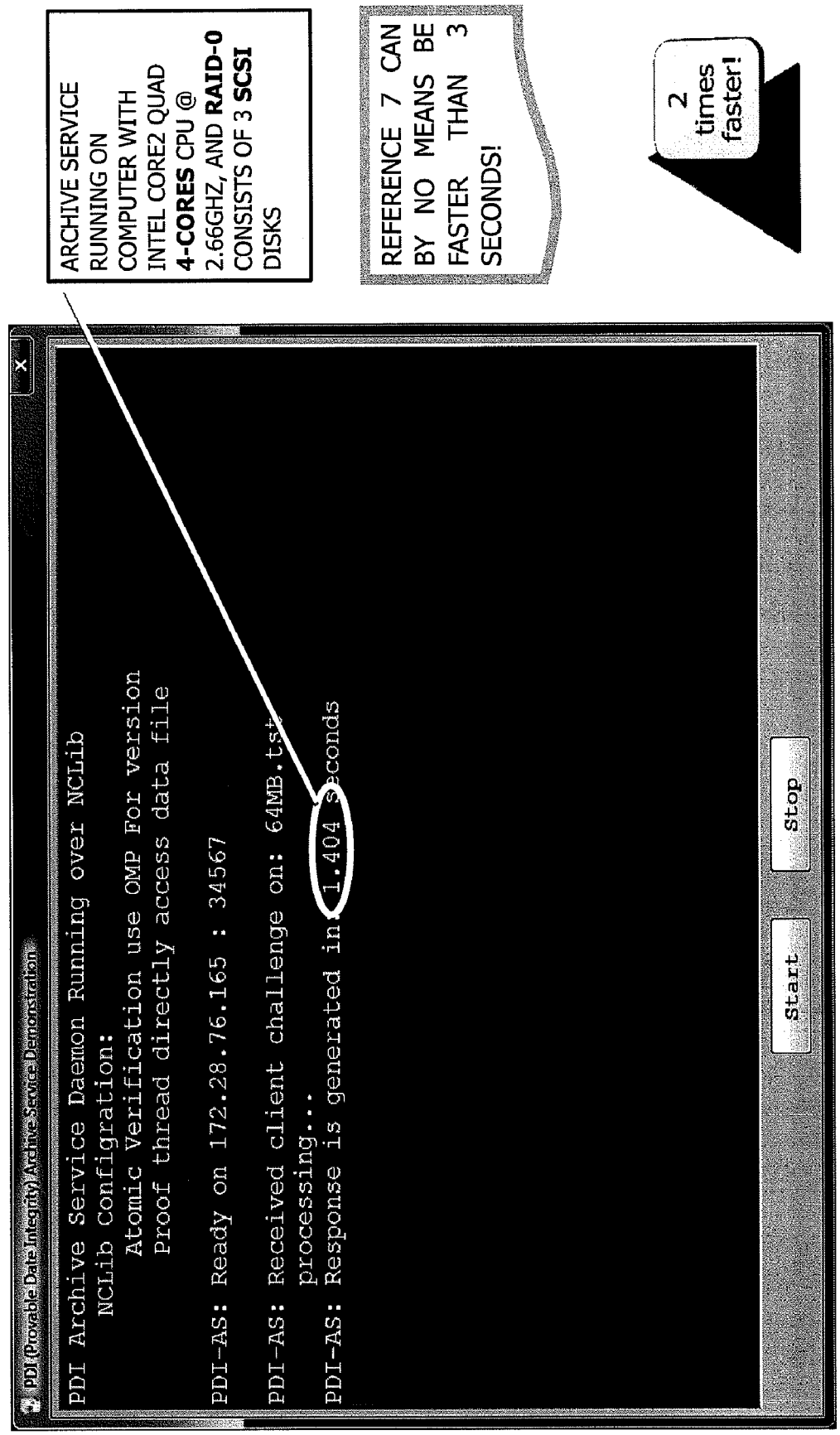
Figure 11:
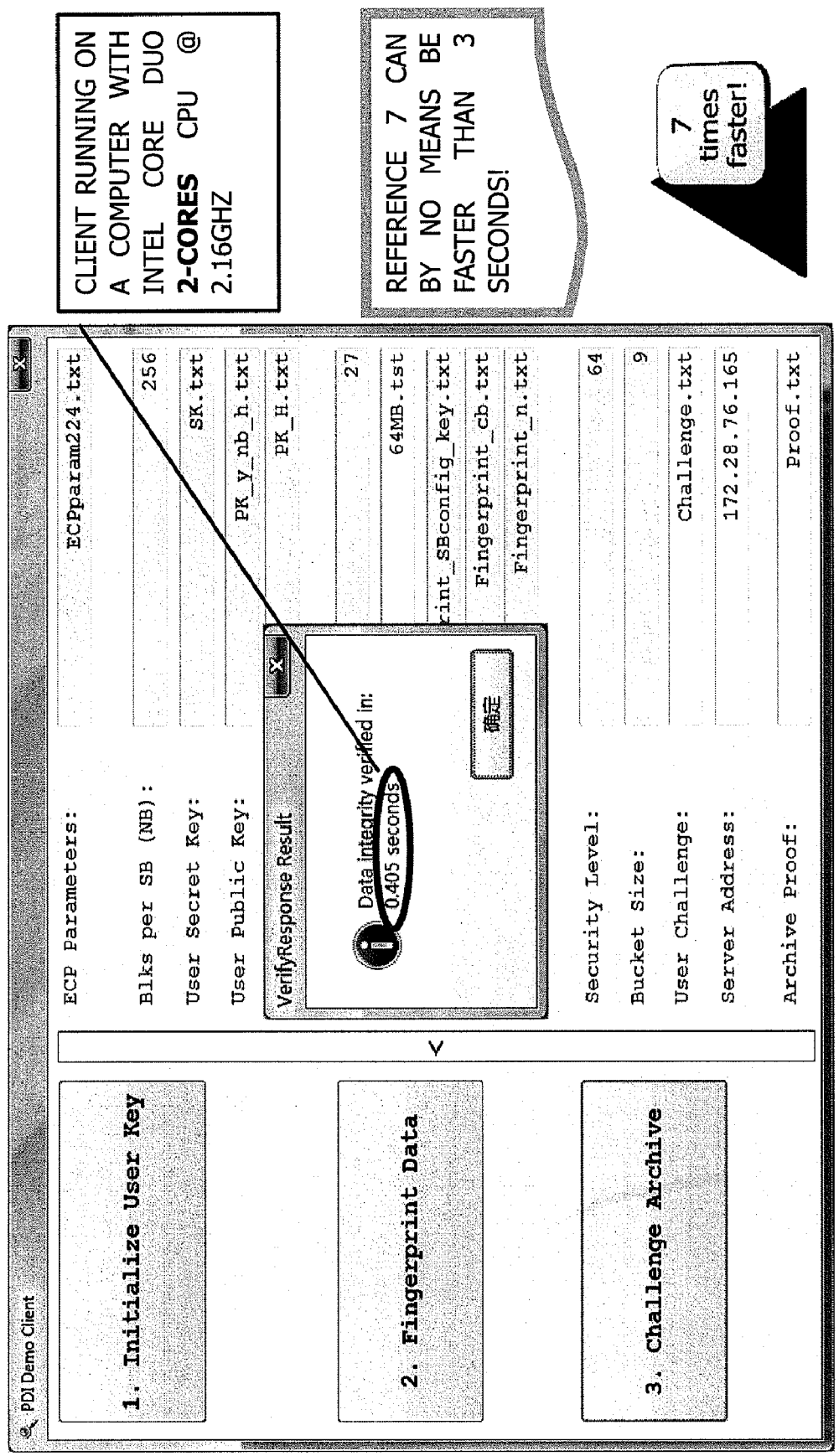

FIG. 3 illustrates how the data M is logically divided and organized into n super blocks. Let $n = \lceil N/n_B \rceil$ denotes the number of super blocks. Notice that the data M will be logically padded with zero in the case that its length is not equal to $N \cdot l_M$ or $n \cdot (n_B \cdot l_M)$ The client executes the following to fingerprint the data.

a) The client selects identifier $$z_M \xleftarrow{R} \mathbb{Z}_p$$

and computes locator $W_i = \text{prf}_2(i, z_M, FN_M) \in \mathbb{G}_1$ $$T_i = \left( W_i \cdot \prod_{j=1}^{n_B} h_j^{M_{(i-1)*n_B+j}} \right)^{\frac{1}{x+z_M}}$$

$$= \left( W_i \cdot g_1^{\sum_{j=1}^{n_B} prf_1(j,x) \cdot M_{(i-1)*n_B+j}} \right)^{\frac{1}{x+z_M}} \in \mathbb{G}_1, \quad i = 1, 2, \ldots, n.$$

Name $T_i$ as the fingerprint of the ith super block b) The client signs $(FN_M, M, z_M, \{T_i\})$ with the secret key $\chi$ which yields signature S c) The client stores $z_M$ for $FN_M$ d) The client sends $FN_M$, M, $z_M \in \mathbb{Z}_p$, $\{T_i\} \in \mathbb{G}_1^n$, and S to the archive e) On receiving $FN_M$, M, $z_M$, $\{T_i\}$, and S, the archive uses the client's public key to verify that S is a valid signature on $(FN_M, M, z_M, \{T_i\})$ Archive Proves Data Integrity In order to make sure that whether the archive retains the content of $FN_M$ at zero-bit error, except with probability at most $2^{-l}$, the client challenges the archive and the archive responses as follows.

i) The client selects repetition factor $1 \leq \psi \leq l$ ii) The client selects $$(\kappa_1, \kappa_2) \xleftarrow{R} \mathbb{Z}_p^2$$

and sends $FN_M$, chal=$(l, \psi, \kappa_1, \kappa_2)$ to the archive iii) On receiving $FN_M$ and chal=$(l, \psi, \kappa_1, \kappa_2)$, the archive first computes $\phi = \lceil l/\psi \rceil + 1$ and initializes transformed fingerprint $T_k = O \in \mathbb{G}_1$, $k = 1, 2, \ldots, \psi$, where O is the identity of $\mathbb{G}_1$. Then the archive repeats the following atomic proof procedure independently $\psi$ times.

iii-a. Initialize packed fingerprint $\vec{T}_v = O \in \mathbb{G}_1$, packed super block $e_{vj} = 0$, and transformed super block $E_j = 0$, $v = 0, 1, \ldots, \Phi - 1 = 2^\phi - 1$, $j = 1, 2, \ldots, n_B$ iii-b. For each $i = 1, 2, \ldots, n$, compute b-i. $\sigma = \text{prf}_3(i, k, \kappa_1)$ b-ii. $\vec{T}_\sigma^* = T_i$, which means adding $T_i$ to the packed fingerprint of the σth box b-iii. For each $j = 1, 2, \ldots, n_B$, compute $e_{\sigma j} += M_{(i-1)*n_B+j} \mod p$, which means adding $M_{(i-1)*n_B+j}$ to the packed super block of the σth box iii-c. For each $v = 1, 2, \ldots, \Phi$, compute c-i. $a_v = \text{prf}_4(v, k, \kappa_2)$ c-ii. $T_k * \vec{T}_v^{a_v}$ c-iii. For each $j = 1, 2, \ldots, n_B$, compute $E_j += a_v \cdot e_{vj} \mod p$ iii-d. Compute $$H_k = prf_5 \left( \prod_{j=1}^{n_B} H_j^{E_j} \right)$$

as the knowledge proof of the transformed super block iv) The archive sends the integrity proof $(T_k, H_k)$, $k = 1, 2, \ldots, \psi$, to the client Alternatively, the client selects $$\kappa_1 \xleftarrow{R} \mathbb{Z}_p$$

and $\kappa_2$ is for instance computed as $\kappa_2 = \text{prf}_1(\kappa_1, \text{"second randomness defining key"})$. Thus n may be omitted from transmission.

Client Verifies Data Integrity

On receiving $(T_k, H_k)$, $k = 1, 2, \ldots, \psi$, the client repeats the following atomic verification procedure independently $\psi$ times.

I) Initialize transformed locator $W_k = I \in \mathbb{G}_1$, packed locator $W_v = I \in \mathbb{G}_1$, $v = 0, 1, \ldots, \Phi - 1 = 2^\phi - 1$ II) For each $i = 1, 2, \ldots, n$, compute $\sigma = \text{prf}_3(i, k, \kappa_1)$ and $W_\sigma^* = \text{prf}_2(i, FN_M)$ III) For each $v = 1, 2, \ldots, \Phi$, compute $a_v = \text{prf}_4(v, k, \kappa_2)$ and $W_k^* = W_v^{-a_v}$ IV) Compute and verify that $$H_k \stackrel{?}{=} prf_5((T_k^{x+z_M} \cdot W_k)^\vartheta).$$

Output TRUE if and only if the congruence holds.

The client is convinced by the data integrity proof if and only if all the atomic verification procedures output TRUE.

Concrete Example

FIGS. 4-7 shows a concrete example of the present invention and its demonstration of the correctness, in which 6 blocks $M_1$-$M_6$ are used and 3 super blocks are formed with $n_B=2$. It is believed that those skilled in the art may understand the present invention quite clearly by referring to FIGS. 4-7 in conjunction with the above description step by step.

Real Experiment

FIGS. 8-11 shows the result of the real experiment in which 256 blocks each having 27 bytes are combined into one super block, $\Phi=2^\Theta=512$ boxes are used, and the data file has a size of 64 M bytes. Meanwhile, FIGS. 9-11 also list the result of Reference 7, from which it can be seen that as compared with Reference 7, the present invention has great improvements on the calculation time costs.

Other Embodiments

Alternative Scheme 1:

Slight modification to step iii-d. of "Archive Proves Data Integrity" and step IV) of "Client Verifies Data Integrity" yields PDI-2 scheme. This is a scheme that supports public verifiability.

The client in addition needs to compute $Y_\Theta = Y^\Theta$ and $g_{2\Theta} = g_2^\Theta$ as his public keys.

Modification to Step iii-d. of "Archive Proves Data Integrity":

iii-dd. Compute $$H_k = \prod_{j=1}^{n_B} H_j^{E_j}$$

as the knowledge proof of the transformed super block

Modification to Step IV) of "Client Verifies Data Integrity":

IV') Compute and verify that $$e(H_k, g_2) \stackrel{?}{=} e(T_k, Y_\vartheta \cdot g_{2\vartheta}^{z_M}) \cdot e(W_k, g_{2\vartheta})$$

The PDI-2 scheme supports public verifiability because none step of "Archive Proves Data Integrity" and "Client Verifies Data Integrity" involves secret key of the client and hence can be effectively executed by a third-party verifier.

Alternative Scheme 1.1:

Slight modification to "Client Verifies Data Integrity" of PDI-2 yields an accelerated PDI-2 scheme.

Modification to Step IV') of "Client Verifies Data Integrity":

IV-e) Select k random numbers $r_k \in Z \subset \mathbb{Z}_p$, where k=1, 2, ..., $\psi$, compute and verify that $$e\left(\prod_{k=1}^{\psi} H_k^{r_k}, g_2\right) \stackrel{?}{=} e\left(\prod_{k=1}^{\psi} T_k^{r_k}, Y_\vartheta \cdot g_{2\vartheta}^{z_M}\right) \cdot e\left(\prod_{k=1}^{\psi} W_k^{r_k}, g_{2\vartheta}\right)$$

By the accelerated PDI-2 scheme, the client devotes less computation power on evaluating the pairings.

Alternative Scheme 2:

Slight modification to step a) of "Client Fingerprints Data" and step IV) of "Client Verifies Data Integrity" yields PDI-3 scheme.

Modification to Step a) of "Client Fingerprints Data":

aa) The client selects identifier $$z_m \stackrel{R}{\leftarrow} \mathbb{Z}_p$$

and computes $$W_i = prf_2(i, z_M, FN_M) \in \mathbb{G}_1,$$

$$T_i = \left(W_i \cdot g_1^{\sum_{j=1}^{n_B} prf_1(j,x) M_{(i-1)*n_B+j}}\right)^x \in \mathbb{G}_1,$$

$$i = 1, 2, \ldots, n$$

Modification to Step IV) of "Client Verifies Data Integrity":

IV''') Compute and verify that $$H_k \stackrel{?}{=} prf_5((T_k^{1/x} \cdot W_k)^\vartheta)$$

Alternative Scheme 3:

Following with above alternative scheme 2, slight modification to step iii-d. of "Archive Proves Data Integrity" and step 1V) of "Client Verifies Data Integrity" yields PDI-4 scheme. This is another scheme that supports public verifiability.

The client in addition needs to compute $Y_\Theta = g_2^{\Theta/x}$ and $g_{2\Theta} = g_2^\Theta$ as his public keys.

Modification to Step iii-d. of "Archive Proves Data Integrity":

$$H_k = \prod_{j=1}^{n_B} H_j^{E_j}$$

iii-ddd. Compute as knowledge proof of transformed super block

Modification to Step IV) of "Client Verifies Data Integrity":

IV'''') Compute and verify that $$e(H_k, g_2) \stackrel{?}{=} e(T_k, Y_\vartheta) \cdot e(W_k, g_{2\vartheta})$$

The PDI-4 scheme supports public verifiability because none step of "Archive Proves Data Integrity" and "Client Verifies Data Integrity" involves secret key of the client and hence can be effectively executed by a third-party verifier.

Alternative Scheme 3.1:

Slight modification to "Client Verifies Data Integrity" of PDI-4 yields an accelerated PDI-4 scheme.

Modification to Step IV''') of "Client Verifies Data Integrity":

IV-f) Select k random numbers $r_k \in Z \subseteq \mathbb{Z}_p$, where k=1, 2, ..., ψ, compute and verify that $$e\left(\prod_{k=1}^{\psi} H_k^{r_k}, g_2\right) \stackrel{?}{=} e\left(\prod_{k=1}^{\psi} T_k^{r_k}, Y_\vartheta\right) \cdot e\left(\prod_{k=1}^{\psi} W_k^{r_k}, g_{2\vartheta}\right)$$

By the accelerated PDI-4 scheme, the client devotes less computation power on evaluating the pairings.

Alternative Scheme 4:

For all the schemes described above, slight modifications to system parameters and steps of "Client Fingerprints Data" and steps of "Client Verifies Data Integrity" yields a scheme that support sampling.

To support sampling, an additional system parameter $prf_6$: $\{0,1\}^* \rightarrow \{1, 2, ..., n\}$ is required. The challenge chal=(l,ψ, $\kappa_1, \kappa_2$) will in addition contain a key $$\kappa_3 \stackrel{R}{\leftarrow} \mathbb{Z}_p$$

and a positive number Λ.

Then for all steps of "Client Fingerprints Data" and "Client Verifies Data Integrity", all the i=1, 2, ..., n will be replaced by i=$prf_6(\theta_3,1)$, $prf_6(\theta_3,2)$, ..., $prf_6(\kappa_3,\Lambda)$. Therefore, data integrity of only the sampled super blocks will be verified since only Λ super blocks that are selected by i=$prf_6(\kappa_3,1)$, $prf_6(\kappa_3,2)$, ..., $prf_6(\kappa_3,\Lambda)$ will be involved.

Thus, by Alternative Scheme 4, the archive may not use all the super blocks to generate data integrity proof. Instead, the client's challenge will inform the archive which and how many of the super blocks will be chosen to generate the proof.

Figure 12:
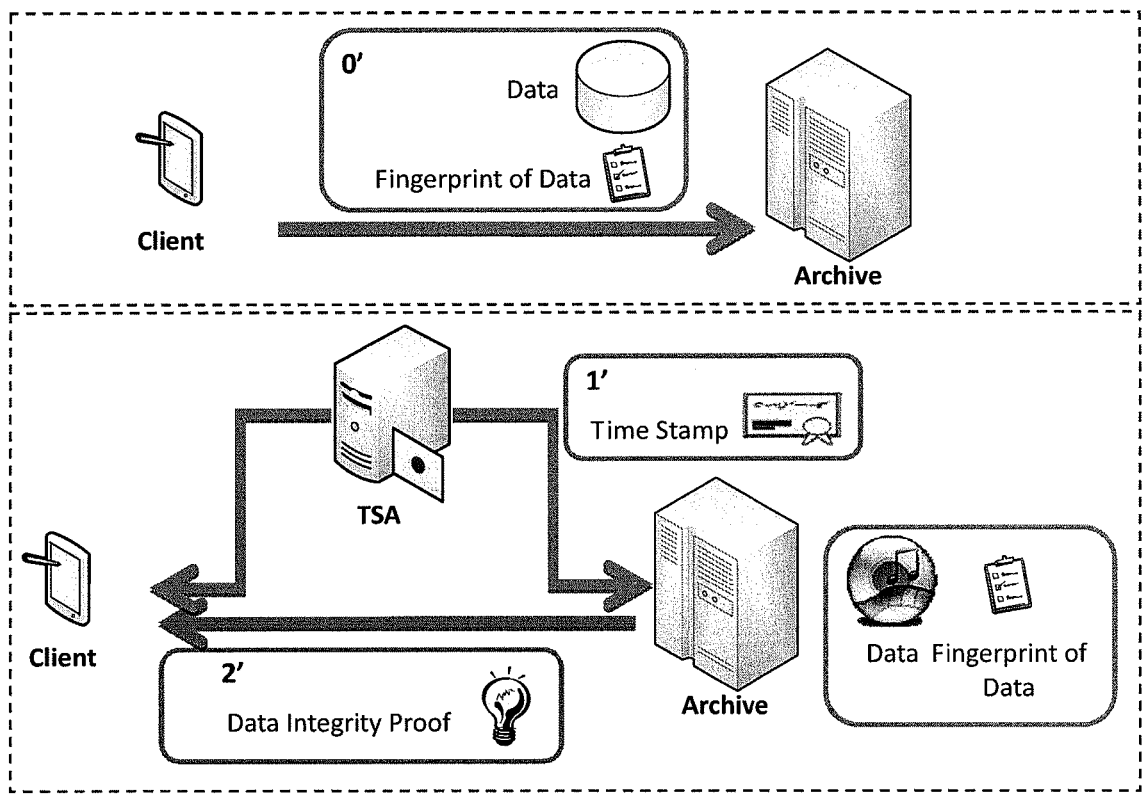
FIG. 12 shows an alternative operation model for proving data integrity.

Alternative Operation Model:

By introducing Time Stamping Authority (TSA) suggested by Reference 4 (RFC 4810), the challenge keys $$(\kappa_1, \kappa_2) \stackrel{R}{\leftarrow} \mathbb{Z}_p^2$$

could be replaced by a digitally signed time stamp come from the TSA, as illustrated in FIG. 12. For example, denote the time stamp as T. Using standard hash algorithm SHA-1, one can obtain $\kappa_2$=SHA-1(T,"1") and $\kappa_2$=SHA-1(T,"2"). With such replacement, what the client challenges for is whether its data is correctly retained up to no earlier than the time the time stamp is released by the TSA. Now both the archive and the client can benefit a lot from pre-computation except for the last step of atomic verification procedure that must utilize the response of the archive, i.e. ($T_k, H_k$).

Figure 13:
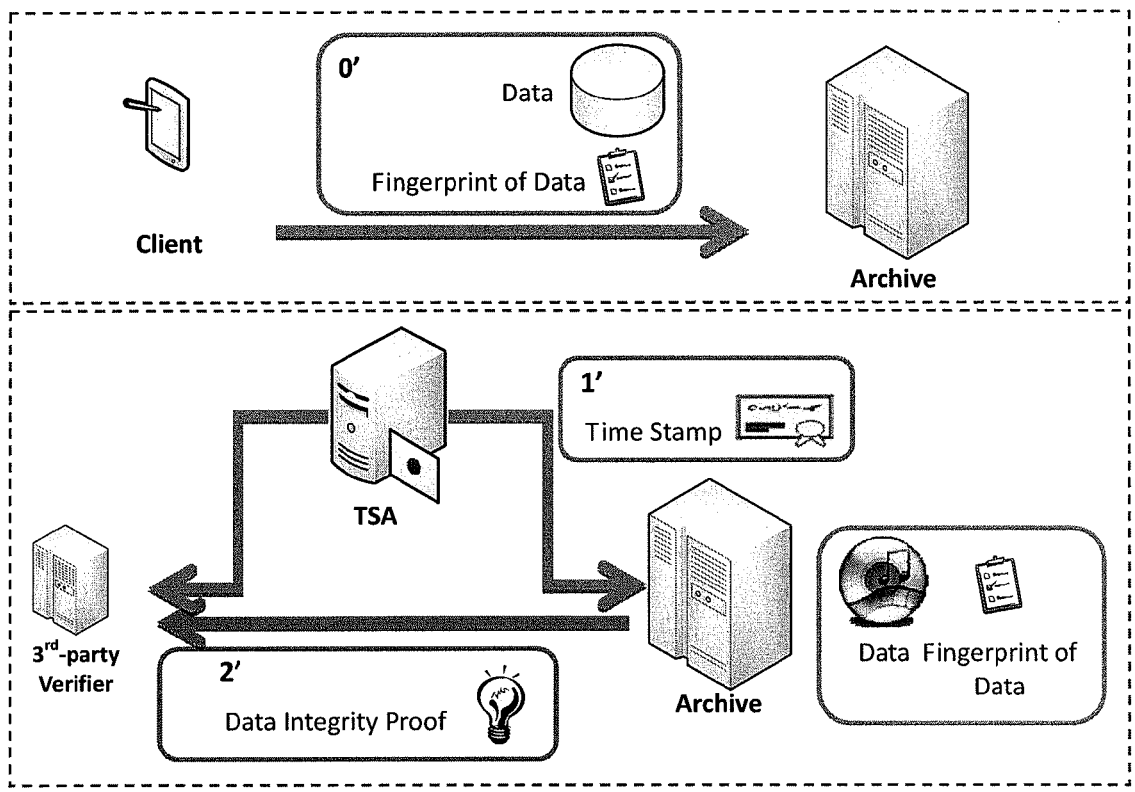
FIG. 13 shows yet another alternative operation model for proving data integrity.

Moreover, as shown in FIG. 13, in the case that the verifier is a third-party verifier, $\kappa_1$ and $\kappa_2$ may be also deduced from the time stamp of the TSA. In the case that sampling is enabled, $\kappa_3$ may for example be deuced from the time stamp of the TSA as $\kappa_3$=SHA-1(T,"3").

Hardware Implementations:

As it is apparent for those skilled in the art, the present invention can be also implemented by hardware constructions. Hereunder, some examples are illustrated for the purpose of description only but should not be construed as any limitations.

Client

Figure 14:
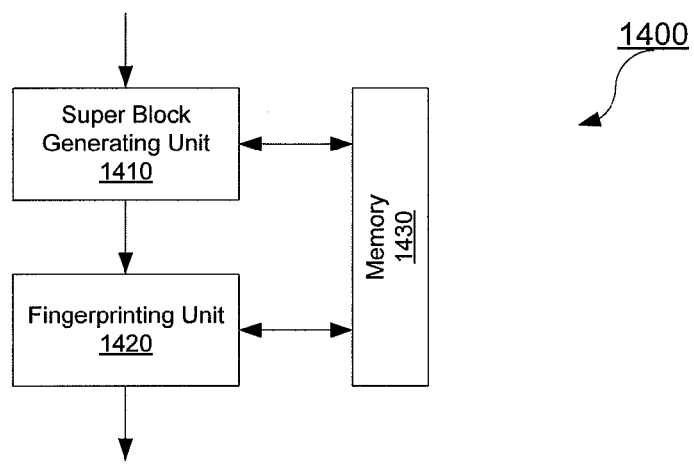
FIG. 14 shows a block diagram of the client 1400 for implementing the present invention.

FIG. 14 shows a block diagram of the client 1400 for implementing the present invention. Herein, the client 1400 is used as an apparatus for fingerprinting data.

As shown in FIG. 14, the client 1400 includes: a super block generating unit 1410 for dividing the data into N blocks $M_i$, i=1, 2, ..., N, and combining each of $n_B$ blocks into a super block to obtain n=⌈$N/n_B$⌉ super blocks; and a fingerprinting unit 1420 for selecting $n_B$ elements $h_i$, j=1, 2 ..., $n_B$ from a finite cyclic group $\mathbb{G}_1 = \langle g_1 \rangle$, and generating a fingerprint $T_k$ for the $k^{th}$ super block respectively, k=1, 2, ..., n, by using a locator $W_k$ for the $k^{th}$ super block, the selected $n_B$ elements $h_j$ and a first private key χ. The client 1400 also includes a memory 1430 for storing the information to be used or generated by the super block generating unit 1410 and the fingerprinting unit 1420, such as the generated super blocks, the finite cyclic group, the generated fingerprints, the locator, and the private key. However, those skilled in the art must be aware that the memory 1430 can be a separate unit as above or can be an/several integrated unit/units incorporated in the super block generating unit 1410 and/or the fingerprinting unit 1420.

Similarly, the $n_B$ elements $h_j$ can be parts of a public key corresponding to the first private key χ. Furthermore, the $n_B$ elements $h_j$ may satisfy a relation of $h_j = g_1^{r_j}$, where $r_j$ are secret keys. Also, the public key and/or the secret keys may be also stored in the memory 1430.

Archive

Figure 15:
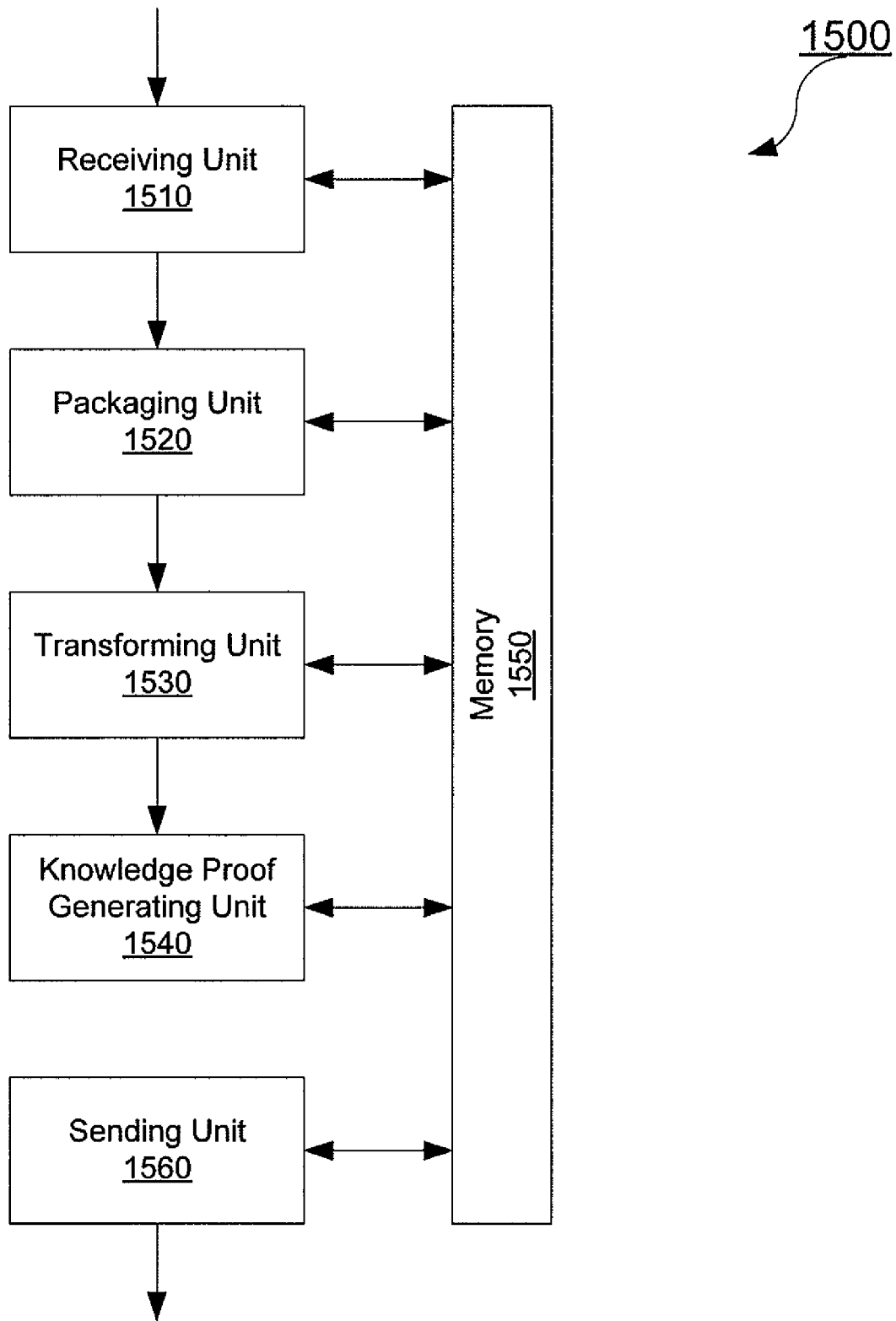
FIG. 15 shows a block diagram of the archive 1500 for implementing the present invention.

FIG. 15 shows a block diagram of the archive 1500 for implementing the present invention. Herein, the achieve 1500 is used as an apparatus for proving data integrity.

As shown in FIG. 15, the archive 1500 includes: a receiving unit 1510 for receiving a challenge comprising at least a first randomness defining key $\kappa_1$ and a second randomness defining key $\kappa_2$; a packaging unit 1520 for constructing Φ boxes, the number of Φ being determined by said challenge, randomly assigning the n fingerprints into the Φ boxes in a first random manner defined by the first randomness defining key $\kappa_1$, each fingerprint being put into one box, and generating Φ packed super blocks and corresponding packed fingerprints based on the above assignment of the n fingerprints; a transforming unit 1530 for randomly transforming the Φ packed super blocks and corresponding packed fingerprints in a second random manner defined by the second randomness defining key $\kappa_2$ to generate a transformed super block and a transformed fingerprint; and a knowledge proof generating unit 1540 for generating a knowledge proof of the transformed super block. The archive 1500 also includes a memory 1550 for storing the information to be used or generated by the receiving unit 1510, the packaging unit 1520, the transforming unit 1530 and the knowledge proof generating unit 1540. However, those skilled in the art must be aware that the memory 1550 can be a separate unit as above or can be an/several integrated unit/units incorporated in the receiving unit 1510, the packaging unit 1520, the transforming unit 1530 and the knowledge proof generating unit 1540.

The knowledge proof generating unit 1540 may generate the knowledge proof of the transformed super block as the transformed super block itself. Alternatively, the knowledge proof generating unit 1540 may generate the knowledge proof of the transformed super block based on the public key and the transformed super block.

The challenge may further comprise a super block selecting key pair ($\kappa_3, \Lambda$) to define which $\Lambda$ super blocks and corresponding fingerprints, instead of all the n super blocks and corresponding fingerprints, will be selected by the packaging unit 1520 for data integrity proving.

The challenge may further comprise a repetition factor $\psi$, and the operations of the packaging unit 1520, the transforming unit 1530 and the knowledge proof generating unit 1540 are repeated the $\psi$ times, each time generate one knowledge proof of the transformed super block which is denoted as an $m^{th}$ knowledge proof of the transformed super block $H_m$, m=1, 2, ..., $\psi$.

The challenge may contain a digitally signed time stamp from a Time Stamping Authority (TSA).

Furthermore, at least one of the first and second randomness defining keys $\kappa_1$ and $\kappa_2$ and the super block selecting key $\kappa_3$ is generated from the digitally signed time stamp.

Furthermore, the archive 1500 may further comprises: a sending unit 1560 for sending the transformed fingerprint(s) and the knowledge proof(s) of the transformed super block(s).

Verifier (Client or Third-Party Verifier)

Figure 16:
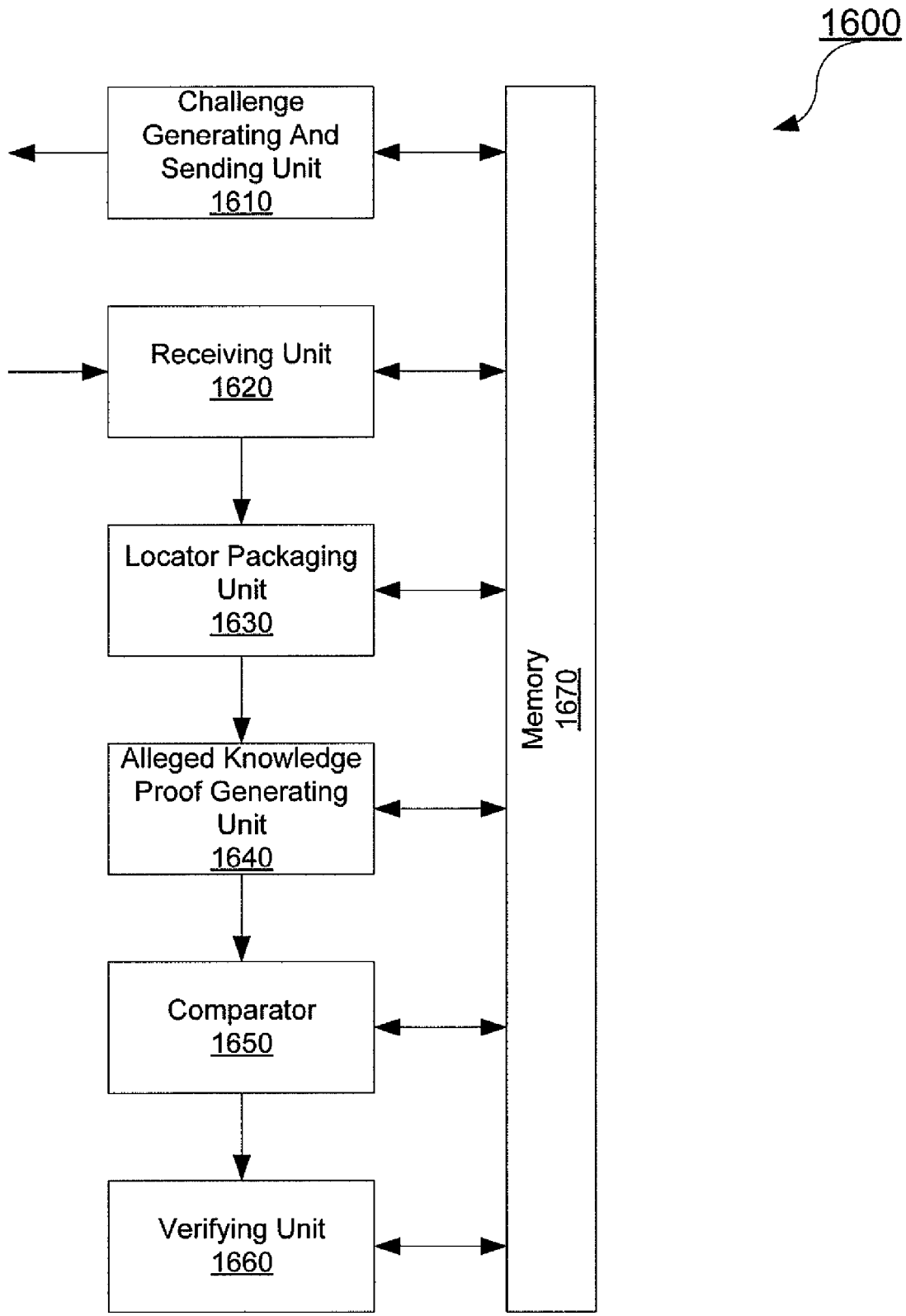
FIG. 16 shows a block diagram of the verifier 1600 for implementing the present invention.

FIG. 16 shows a block diagram of the verifier 1600 for implementing the present invention. Herein, the verifier 1600 is used as an apparatus for verifying data integrity. Also, as it is apparent for those skilled in the art, the verifier 1600 can be the client 1400 itself or a third-party verifier. In the former case where the verifier 1600 is the client 1400 itself, it means that the client 1400 includes a sub-system for fingerprinting data as shown in FIG. 14 and a sub-system for verifying data integrity as shown in FIG. 16. On the other hand, in the latter case where the verifier 1600 is a third-party verifier, it means that the third-party verifier is only necessary to have the structure as shown in FIG. 16 and the structure as shown in FIG. 14 is optional.

As shown in FIG. 16, the verifier 1600 includes: a challenge generating and sending unit 1610 for generating and sending a challenge comprising at least a first randomness defining key $\kappa_1$ and a second randomness defining key $\kappa_2$; a receiving unit 1620 for receiving a transformed fingerprint and a knowledge proof of the transformed super block; a locator packaging unit 1630 for constructing $\Phi$ boxes, randomly assigning the n locators $W_k$ into the $\Phi$ boxes in the first random manner, each locator being put into one box, and generating $\Phi$ packed locators based on the above assignment of the n locators; an alleged knowledge proof generating unit 1640 for randomly transforming the $\Phi$ packed locators in the second random manner to generate a transformed locator, and generating an alleged knowledge proof of the transformed super block from the transformed fingerprint and the transformed locator; a comparator 1650 for comparing the alleged knowledge proof of the transformed super block with the received knowledge proof of the transformed super block; and a verifying unit 1660 for verifying the data integrity if the comparison result is positive. The verifier 1600 also includes a memory 1670 for storing the information to be used or generated by the challenge generating and sending unit 1610, the receiving unit 1620, the locator packaging unit 1630, the alleged knowledge proof generating unit 1640, the comparator 1650 and the verifying unit 1660. However, those skilled in the art must be aware that the memory 1670 can be a separate unit as above or can be an/several integrated unit/units incorporated in the challenge generating and sending unit 1610, the receiving unit 1620, the locator packaging unit 1630, the alleged knowledge proof generating unit 1640, the comparator 1650 and the verifying unit 1660.

The alleged knowledge proof generating unit 1640 may generate the alleged knowledge proof of the transformed super block based on the identifier $z_M$ for the data, the transformed fingerprint and the transformed locator.

The alleged knowledge proof generating unit 1640 may generate the alleged knowledge proof of the transformed super block further based on first and second private key $\chi$ and $\theta$.

The challenge generated by the challenge generating and sending unit 1610 may further comprise a super block selecting key pair ($\kappa_3, \Lambda$) to define which $\Lambda$ locators, instead of all the n locators, will be selected by the locator packaging unit for data integrity verifying.

The challenge generated by the challenge generating and sending unit 1610 may further comprise a repetition factor $\psi$, and the operations of the locator packaging unit 1630, the alleged knowledge proof generating unit 1640 and the comparator 1650 are repeated the $\psi$ times, and only if all the comparison results are positive, the verifying unit 1660 verifies the data integrity.

The challenge generated by the challenge generating and sending unit 1610 may contain a digitally signed time stamp from a Time Stamping Authority (TSA).

The challenge generating and sending unit 1610 determines at least one of the first and second randomness defining keys $\kappa_1$ and $\kappa_2$ and the super block selecting key $\kappa_3$ from the digitally signed time stamp.

The foregoing description gives only the preferred embodiments of the present invention and is not intended to limit the present invention in any way. Thus, any modification, substitution, improvement or like made within the spirit and principle of the present invention should be encompassed by the scope of the present invention.

What is claimed is:

1. A method of verifying data integrity comprising:
fingerprinting data, by a client, by:
dividing the data into N blocks $M_i$, i=1, 2 ..., N;
combining each of $n_B$ blocks into a super block to obtain n=[N/$n_B$] super blocks;
selecting $n_B$ elements $h_j$, i=1, 2, ..., $n_B$, from a finite cyclic group $G_1$=<$g_1$>,
and generating a fingerprint $T_k$ for the $k^{th}$ super block respectively, k=1, 2, ..., n, by using a locator $W_k$ for the $k^{th}$ super block, the selected $n_B$ elements $h_j$ and a first private key $\chi$;
generating and sending, by a client, a challenge comprising at least a first randomness defining key $\kappa_1$ and a second randomness defining key $\kappa_2$;
generating and sending, by a server, a transformed fingerprint and a knowledge proof of the transformed super block by:
constructing $\Phi$ boxes;
randomly assigning the n fingerprints into the $\Phi$ boxes in a first random manner defined by the first randomness defining key $\kappa_1$, each fingerprint being put into one box;
generating $\Phi$ packed super blocks and corresponding packed fingerprints based on the above assignment of the n fingerprints;
randomly transforming the $\Phi$ packed super blocks and corresponding packed fingerprints in a second random manner defined by the second randomness defining key $\kappa_2$ to generate a transformed super block and a transformed fingerprint;
generating a knowledge proof of the transformed super block; and verifying data integrity, by the client, by:
constructing Φ boxes;
randomly assigning the n locators $W_k$ into the Φ boxes in the first random manner, each locator being put into one box;
generating Φ packed locators based on the above assignment of the n locators;
randomly transforming the Φ packed locators in the second random manner to generate a transformed locator;
generating an alleged knowledge proof of the transformed super block from the transformed fingerprint and the transformed locator; and
comparing the alleged knowledge proof of the transformed super block with the received knowledge proof of the transformed super block.

2. The method of verifying data integrity according to claim 1, wherein the alleged knowledge proof of the transformed super block is generated based on an identifier $z_M$ for the data, the transformed fingerprint and the transformed locator.

3. The method of verifying data integrity according to claim 1, wherein the challenge further comprises a super block selecting key pair $(\kappa_3, \Lambda)$ to define which Λ locators, instead of all the n locators, will be selected for data integrity verifying.

4. The method of verifying data integrity according to claim 1, wherein the challenge further comprises a repetition factor ψ, and the steps from the box constructing to the comparison of knowledge proof and alleged knowledge proof are repeated the ψ times, and only if all the comparison results are positive, the data integrity for the data is verified.

5. The method of verifying data integrity according to claim 1, wherein the $n_B$ elements $h_j$ are parts of a public key corresponding to the first private key $\chi$.

6. The method of verifying data integrity according to claim 1, wherein the $n_B$ elements $h_j$ satisfy a relation of $h_j = g_1^{r_j}$ where $r_j$ are secret keys.

7. The method of verifying data integrity according to claim 1, wherein the fingerprint $T_k$ for the $k^{th}$ super block is generated according to $$T_k = \left( W_k \cdot \prod_{j=1}^{n_B} h_j^{M_{(k-1)*n_B+j}} \right)^{\frac{1}{\chi + z_M}}$$

in which $z_M$ is an identifier for the data.

8. The method of verifying data integrity according to claim 1, wherein the fingerprint $T_k$ for the $k^{th}$ super block is generated according to $$T_k = \left( W_k \cdot \prod_{j=1}^{n_B} h_j^{M_{(k-1)*n_B+j}} \right)^{\chi}.$$

9. The method of verifying data integrity according to claim 1, wherein the knowledge proof of the transformed super block is the transformed super block itself.

10. The method of verifying data integrity according to claim 1, wherein the knowledge proof of the transformed super block is generated based on the public key and the transformed super block.

11. The method of verifying data integrity according to claim 1, wherein the challenge further comprises a super block selecting key pair $(\kappa_3, \Lambda)$ to define which Λ super blocks and corresponding fingerprints, instead of all the n super blocks and corresponding fingerprints, will be selected for data integrity proving.

12. The method of verifying data integrity according to claim 1, wherein the challenge further comprises a repetition factor ψ, and the steps from the box constructing to the knowledge proof generating are repeated the ψ times, each time generates one knowledge proof of the transformed super block which is denoted as an $m^{th}$ knowledge proof of the transformed super block $H_m$, m=1, 2, ..., ψ.

13. The method of verifying data integrity according to claim 2, wherein the alleged knowledge proof of the transformed super block is generated further based on the first private keys $\chi$ and a second private key θ.

14. The method of verifying data integrity according to claim 2, wherein the identifier $z_M$ is changeable according to the data.

15. The method of verifying data integrity according to claim 2, wherein the alleged knowledge proof of the transformed super block is generated as $$e(T, Y_\theta \cdot g_{2\theta}^{z_M}) \cdot e(W, g_{2\theta})$$

in which $Y_\theta = Y^\theta$, $g_{2\theta} = g_2^\theta$, $Y = g_2^\theta \in G_2$; $G_2 = \langle g_2 \rangle$ is a finite cyclic group having an additional group $G = \langle g \rangle$ with $G_1 = \langle g_1 \rangle$ such that $|G_1| = |G_2| = |G| = p$ where p is a large prime; $e: G_1 \times G_2 \to G$ is a bilinear map function; T denotes the transformed fingerprint; W denotes the transformed locator; the locator $W_k$ for the $k^{th}$ super block is a hash value taking at least k as an input; $\chi$ is the first private key and θ is a second private key; and the alleged knowledge proof of the transformed super block is compared with the knowledge proof of the transformed super block as $$e(H, g_2) \stackrel{?}{=} e(T, Y_\theta \cdot g_{2\theta}^{z_M}) \cdot e(W, g_{2\theta})$$

where H denotes the knowledge proof of the transformed super block.

16. The method of verifying data integrity according to claim 2, wherein the alleged knowledge proof of the transformed super block is generated as $$e(T, Y_\theta) \cdot e(W, g_{2\theta})$$

in which $Y_\theta = g_2^{\theta/z}$, $g_{2\theta} = g_2^\theta$, $Y = g_2^z \in G_2$; $G_2 = \langle g_2 \rangle$ is a finite cyclic group having an additional group $G = \langle g \rangle$ with $G_1 = \langle g_1 \rangle$ such that $|G_1| = |G_2| = |G| = p$ where p is a large prime; $e: G_1 \times \to G$ is a bilinear map function; T denotes the transformed fingerprint; W denotes the transformed locator; the locator $W_k$ for the $k^{th}$ super block is a hash value taking at least k and the identifier $z_M$ for the data as inputs; and $\chi$ and θ are the first and second private keys; and the alleged knowledge proof of the transformed super block is compared with the knowledge proof of the transformed super block as $$e(H, g_2) \stackrel{?}{=} e(T, Y_\theta) \cdot e(W, g_{2\theta})$$

where H denotes the knowledge proof of the transformed super block.

17. The method of verifying data integrity according to claim 13, wherein the alleged knowledge proof of the transformed super block is represented as $$prf_5((T^{1/\chi} \cdot W)^\theta),$$

where T denotes the transformed fingerprint, and W denotes the transformed locator; and the locator $W_k$ for the $k^{th}$ super block is a hash value taking at least k and the identifier $z_M$ for the data as inputs.

18. The method of verifying data integrity according to claim 13, wherein the alleged knowledge proof of the transformed super block is represented as $$prf_5((T^{\theta+z_M} \cdot W)^\theta),$$

where T denotes the transformed fingerprint, and W denotes the transformed locator; and the locator $W_k$ for the $k^{th}$ super block is a hash value taking at least k as an input.

19. The method of verifying data integrity according to claim 17, wherein the locator $W_k$ for the $k^{th}$ super block further includes a data file name and/or a version number for the data.

20. The method of verifying data integrity according to claim 18, wherein the locator $W_k$ for the $k^{th}$ super block further includes a data file name and/or a version number for the data.

21. The method of verifying data integrity according to claim 15, wherein the locator $W_k$ for the $k^{th}$ super block further includes a data file name and/or a version number for the data.

22. The method of verifying data integrity according to claim 15, wherein the challenge further includes a verification acceleration factor $\psi$, k random numbers $r_k \in Z \subset Z_p$ are selected, where k=1, 2, ..., $\psi$, and it computes and verifies that $$e\left(\prod_{k=1}^{\psi} H_k^{r_k}, g_2\right) \stackrel{?}{=} e\left(\prod_{k=1}^{\psi} T_k^{r_k}, Y_\vartheta \cdot g_{2\vartheta}^{z_M}\right) \cdot e\left(\prod_{k=1}^{\psi} W_k^{r_k}, g_{2\vartheta}\right).$$

23. The method of verifying data integrity according to claim 16, wherein the locator $W_k$ for the $k^{th}$ super block further includes a data file name and/or a version number for the data.

24. The method of verifying data integrity according to claim 16, wherein the identifier $z_M$ is changeable according to the data.

25. The method of verifying data integrity according to claim 16, wherein the challenge further includes a verification acceleration factor $\psi$, k random numbers $r_k \in Z \subset Z_p$ are selected, where k=1, 2, ..., $\psi$, and it computes and verifies that $$e\left(\prod_{k=1}^{\psi} H_k^{r_k}, g_2\right) \stackrel{?}{=} e\left(\prod_{k=1}^{\psi} T_k^{r_k}, Y_\vartheta\right) \cdot e\left(\prod_{k=1}^{\psi} W_k^{r_k}, g_{2\vartheta}\right).$$

26. The method of verifying data integrity according to claim 3, wherein the first and second randomness defining keys $\kappa_1$ and $\kappa_2$ and the super block selecting key pair $(\kappa_3, \Lambda)$ are selected by a verifier.

27. The method of verifying data integrity according to claim 26, wherein the challenge contains a digitally signed time stamp from a Time Stamping Authority (TSA).

28. The method of verifying data integrity according to claim 27, wherein at least one of the first and second randomness defining keys $\kappa_1$ and $\kappa_2$ and the super block selecting key $\kappa_3$ is generated from the digitally signed time stamp.

29. An apparatus for verifying data integrity, comprising:
a super block generating unit which divides data into N blocks $M_i$, i=1, 2 ..., N, and combines each of $n_B$ blocks into a super block to obtain n=[N/$n_B$] super blocks;
a fingerprinting unit which selects $n_B$ elements $h_j$, j=1, 2 ..., $n_B$, from a finite cyclic group $G_1 = <g_1>$ and generating a fingerprint $T_k$ for the $k^{th}$ su per block respectively k=1, 2 ..., n, by using a locator $W_k$ for the $k^{th}$ super block, the selected $n_B$ elements $h_j$ and a first private key $\chi$;
a challenge generating and sending unit which generates and sends a challenge comprising at least a first randomness defining key $\kappa_i$ and a second randomness defining key $\kappa_2$;
a challenge receiving unit which receives the challenge;
a packaging unit which constructs $\Phi$ boxes, randomly assigns the n fingerprints into the $\Phi$ boxes in a first random manner defined by the first randomness defining $\kappa_1$, each fingerprint being put into one box, and generates $\Phi$ packed super blocks and corresponding packed fingerprints based on the above assignment of the n fingerprints;
a transforming unit which randomly transforms the $\Phi$ packed super blocks and corresponding packed fingerprints in a second random manner defined by the second randomness defining key $\kappa_2$ to generate a transformed super and a transformed fingerprint;
a knowledge proof generating unit which generates a knowledge proof of the transformed super block and sends the knowledge proof of the transformed super block and the transformed fingerprint;
a receiving unit which receives the transformed fingerprint and the received knowledge proof of the transformed super block;
a locator packaging unit which constructs $\Phi$ boxes, randomly assigns the n locators $W_k$ into the $\Phi$ boxes in the first random manner, each locator being put into one box, and generates $\Phi$ packed locators based on the above assignment of the n locators;
an alleged knowledge proof generating unit which randomly transforms the $\Phi$ packed locators in the second random manner to generate a transformed locator, and generates an alleged knowledge proof of the transformed super block from the transformed fingerprint and the transformed locator; and
a comparator which compares the alleged knowledge proof of the transformed super block with the received knowledge proof of the transformed super block.

30. The apparatus for verifying data integrity according to claim 29, wherein the alleged knowledge proof generating unit generates the alleged knowledge proof of the transformed super block based on an identifier $z_M$ for the data, the transformed fingerprint and the transformed locator.

31. The apparatus for verifying data integrity according to claim 29, wherein the challenge generated by the challenge generating and sending unit further comprises a super block selecting key pair $(\kappa_3, \Lambda)$ to define which $\Lambda$ locators, instead of all the n locators, will be selected by the locator packaging unit for data integrity verifying.

32. The apparatus for verifying data integrity according to claim 29, wherein the challenge generated by the challenge generating and sending unit further comprises a repetition factor $\psi$, and the operations of the locator packaging unit, the alleged knowledge proof generating unit and the comparator are repeated the $\psi$ times, and only if all the comparison results are positive, the verifying unit verifies the data integrity.

33. The apparatus for verifying data integrity according to claim 29, wherein the $n_B$ elements $h_j$ are parts of a public key corresponding to the first private key $\chi$.

34. The apparatus for verifying data integrity according to claim 29, wherein the $n_B$ elements $h_j$ satisfy a relation of $h_j = g_1^{r_j}$, where $r_j$ are secret keys.

35. The apparatus for verifying data integrity according to claim 29, wherein the knowledge proof generating unit generates the knowledge proof of the transformed super block as the transformed super block itself.

36. The apparatus for verifying data integrity according to claim 29, wherein the knowledge proof generating unit generates the knowledge proof of the transformed super block based on the public key and the transformed super block.

37. The apparatus for verifying data integrity according to claim 29, wherein the challenge further comprises a super block selecting key pair $(\kappa_3, \Lambda)$ to define which $\Lambda$ super blocks and corresponding fingerprints, instead of all the n super blocks and corresponding fingerprints, will be selected by the packaging unit for data integrity proving.

38. The apparatus for verifying data integrity according to claim 29, wherein the challenge further comprises a repetition factor w, and the operations of the packaging unit, the transforming unit and the knowledge proof generating unit are repeated the $\psi$ times, each time generate one knowledge proof of the transformed super block which is denoted as an $m^{th}$ knowledge proof of the transformed super block $H_m$, $m=1, 2, \ldots, \psi$.

39. The apparatus for verifying data integrity according to claim 30, wherein the alleged knowledge proof generating unit generates the alleged knowledge proof of the transformed super block further based on the first private key $\chi$ and a second private key $\theta$.

40. The apparatus for verifying data integrity according to claim 31, wherein the challenge generated by the challenge generating and sending unit contains a digitally signed time stamp from a Time Stamping Authority (TSA).

41. The apparatus for verifying data integrity according to claim 40, wherein the challenge generating and sending unit determines at least one of the first and second randomness defining keys $\kappa_1$ and $\kappa_2$ and the super block selecting key $\kappa_3$ from the digitally signed time stamp.

42. A data integrity verifying system, comprising:
an apparatus for proving data integrity including:
  a receiving unit for receiving a challenge comprising at least a first randomness defining key $\kappa_i$ and a second randomness defining key $\kappa_2$;
  a packaging unit for constructing $\Phi$ boxes, randomly assigning the n fingerprints into the $\Phi$ boxes in a first random manner defined by the first randomness defining key $\kappa_1$, each fingerprint being put into one box, and generating $\Phi$ packed super blocks and corresponding packed fingerprints based on the above assignment of the n fingerprints;
  a transforming unit for randomly transforming the $\Phi$ packed super blocks and corresponding packed fingerprints in a second random manner defined by the second randomness defining key $\kappa_2$ to generate a transformed super block and a transformed fingerprint; and
  a knowledge proof generating unit for generating a knowledge proof of the transformed super block; and an apparatus for verifying data integrity including:
  a challenge generating and sending unit for generating and sending a challenge comprising at least a first randomness defining key $\kappa_1$ and a second randomness defining key $\kappa_2$;
  a receiving unit for receiving a transformed fingerprint and a knowledge proof of the transformed super block;
  a locator packaging unit for constructing $\Phi$ boxes, randomly assigning the n locators $W_k$ into the $\Phi$ boxes in the first random manner, each locator being put into one box, and generating $\Phi$ packed locators based on the above assignment of the n locators;
  an alleged knowledge proof generating unit for randomly transforming the $\Phi$ packed locators in the second random manner to generate a transformed locator, and generating an alleged knowledge proof of the transformed super block from the transformed fingerprint and the transformed locator;
  a comparator for comparing the alleged knowledge proof of the transformed super block with the received knowledge proof of the transformed super block; and
  a verifying unit for verifying the data integrity if the comparison result is positive.

43. The data integrity verifying system according to claim 42, further comprising: an apparatus for fingerprinting data including:
  a super block generating unit for dividing the data into N blocks $M_i$, $i=1, 2, \ldots, N$, and combining each of $n_B$ blocks into a super block to obtain $n=[N/n_B]$ super blocks; and
  a fingerprinting unit for selecting $n_B$ elements $h_j$, $j=1, 2, \ldots, n_B$, from a finite cyclic group $G_1 = \langle g_1 \rangle$, and generating a fingerprint $T_k$ for the $k^{th}$ super block respectively, $k=1, 2, \ldots, n$, by using a locator $W_k$ for the $k^{th}$ super block, the selected $n_B$ elements $h_j$ and a first private key $\chi$.

44. The data integrity verifying system according to claim 43, wherein the apparatus for fingerprinting data is also used as the apparatus for verifying data integrity.

45. The method of verifying data integrity according to claim 7, wherein the locator $W_k$ for the $k^{th}$ super block is a hash value taking at least k as an input.

46. The method of verifying data integrity according to claim 8, wherein the locator $W_k$ for the $k^{th}$ super block is a hash value taking at least k and an identifier $z_M$ for the data as inputs.

47. The method of verifying data integrity according to claim 45 or 46, wherein the locator $W_k$ for the $k^{th}$ super block further includes a data file name and/or a version number for the data.

48. The method of verifying data integrity according to claim 7 or 46, wherein the identifier $z_M$ is changeable according to the data.

49. The method of verifying data integrity according to claim 10, wherein the knowledge proof of the transformed super block H is represented as $$H = \prod_{j=1}^{n_B} H_j^{E_j}$$

in which $H_j = h_j^\theta$, where $\theta$ is a second private key, and $E_j$ is the transformed super block.

50. The method of verifying data integrity according to claim 10, wherein the knowledge proof of the transformed super block H is represented as $$H = prf_5\left(\prod_{j=1}^{n_B} H_j^{E_j}\right)$$

in which $H_j = h_j^\theta$, where $\theta$ is a second private key, $E_j$ is the transformed super block, and $prf_5(\bullet)$ denotes a pseudo random function.

51. The method of verifying data integrity according to claim 11, wherein the first and second randomness defining keys $\kappa_1$ and $\kappa_2$ and the super block selecting key pair $(\kappa_3, \Lambda)$ are selected by a verifier.

52. The method of verifying data integrity according to claim 12, wherein the number of $\Phi$ equals to $2^\phi$, where $\phi = [l/\psi] + 1$, and l is a security level factor that determines the security level of the method.

53. The method of verifying data integrity according to claim 51, wherein the challenge contains a digitally signed time stamp from a Time Stamping Authority (TSA).

54. The method of verifying data integrity according to claim 53, wherein at least one of the first and second randomness defining keys $\kappa_1$ and $\kappa_2$ and the super block selecting key $\kappa_3$ is generated from the digitally signed time stamp.

55. The apparatus for verifying data integrity according to claim 37, wherein the challenge contains a digitally signed time stamp from a Time Stamping Authority (TSA).

56. The apparatus for verifying data integrity according to claim 55, wherein at least one of the first and second randomness defining keys $\kappa_1$ and $\kappa_2$ and the super block selecting key $\kappa_3$ is generated from the digitally signed time stamp.

* * * * *

UNITED STATES PATENT AND TRADEMARK OFFICE
CERTIFICATE OF CORRECTION

PATENT NO. : 8,254,569 B2
APPLICATION NO. : 12/345348
DATED : August 28, 2012
INVENTOR(S) : Ke Zeng Page 1 of 3

It is certified that error appears in the above-identified patent and that said Letters Patent is hereby corrected as shown below:

In the Specification

Column 5, Line 65: Delete " $Y=g_2^x \in G_2;(\ldots)g_2 G_2$ " and insert -- $Y = g_2^x \in G_2; \; G_2 = \langle g_2 \rangle$ --

Column 5, Line 66: Delete " $g = \langle g \rangle$ " and insert -- $\mathcal{G} = \langle g \rangle$ --

Column 6, Line 1: Delete " $G_1=G_2=|G|=p$ " and insert -- $|G_1| = |G_2| = |\mathcal{G}| = p$ --

Column 6, Line 20: Delete " $e(T,Y_B)\cdot e(W,g_{2,a})$ " and insert -- $e(T,Y_B) \cdot e(W, g_{2,a})$ --

Column 6 (Approx.): Line 22: Delete " $\mathcal{G}\langle g \rangle$ " and insert -- $\mathcal{G} = \langle g \rangle$ --

Column 6, Line 24: Delete " $G_1=G_2=|\mathcal{G}|=p$ " and insert -- $|G_1| = |G_2| = |\mathcal{G}| = p$ --

Column 6, Line 61: Delete "n$_B$" and insert -- n$_B$, --

Column 9, Line 17: Delete " $\Phi=2^9=512$ " and insert -- $\Phi = 2^9 = 512$ --

Column 10, Line 57: Delete "Λth" and insert -- λth --

Signed and Sealed this
Twenty-first Day of October, 2014

Michelle K. Lee
*Deputy Director of the United States Patent and Trademark Office*

CERTIFICATE OF CORRECTION (continued)
U.S. Pat. No. 8,254,569 B2

Column 12, Line 10-14 (Approx.): Delete "$W = \prod_{\lambda=1}^{\Phi} \hat{W}_\lambda^{a_\lambda}$," and insert -- $W = \prod_{\lambda=1}^{\Phi} \hat{W}_\lambda^{a_\lambda}$, --

Column 13, Line 24: Delete "$n_B$" and insert -- $n_B$, --

Column 14, Line 12: Delete "$T_k = O \in G_1$," and insert -- $T_k = \mathcal{O} \in \mathbb{G}_1$, --

Column 14, Line 12: Delete "O" and insert -- $\mathcal{O}$ --

Column 14, Line 16: Delete "$\vec{T}_v = O \in G_1$," and insert -- $\vec{T}_v = \mathcal{O} \in \mathbb{G}_1$, --

Column 14, Line 31 (Approx.): Delete "$T_k * \vec{T}_v^{a_v}$" and insert -- $T_k * = \vec{T}_v^{a_v}$ --

Column 14, Line 54: Delete "n" and insert -- $\kappa_3$ --

Column 15, Line 21: Delete "$\Phi = 2^9 = 512$" and insert -- $\Phi = 2^9 = 512$ --

Column 16, Line 41: Delete "1V)" and insert -- IV) --

Column 16, Line 50: Below "Integrity" delete "$H_k = \prod_{j=1}^{n_B} H_j^{k_j}$"

Column 16, Line 54: After "Compute" insert -- $H_k = \prod_{j=1}^{n_B} H_j^{k_j}$ --

Column 17, Line 33 (Approx.): Delete "$i = prf_6(\theta_3, 1), prf_6(\theta_3, 2), \ldots, prf_6(\kappa_3, \Lambda).$" and insert -- $i = prf_6(\kappa_3, 1), prf_6(\kappa_3, 2), \ldots, prf_6(\kappa_3, \Lambda).$ --

Column 17, Line 53: Delete "$\kappa_3 = SHA-1(T, "1")$" and insert -- $\kappa_3 = SHA-1(T, "1")$ --

Column 18, Line 13: Delete "$h_j, j = 1, 2, \ldots, n_B$" and insert -- $h_j, j = 1, 2, \ldots, n_B$, --

CERTIFICATE OF CORRECTION (continued)
U.S. Pat. No. 8,254,569 B2

In the Claims

Column 20, Line 36: In Claim 1, delete "integrity" and insert -- integrity, --

Column 20, Line 41: In Claim 1, delete " i= 1, 2, . . . , $n_B$," and insert -- j= 1, 2, . . . , $n_B$, --

Column 22, Line 16: In Claim 13, delete "keys" and insert -- key --

Column 22, Line 49: In Claim 16, delete "$Y = g_2^x \in G_2;$" and insert -- $Y = g_2^x \in G_2;$ --

Column 23, Line 5: In Claim 17, delete "$prf_5((T^{1/x} \cdot W)^\theta),$" and insert -- $prf_5((T^{1/x} \cdot W)^\theta),$ --

Column 23, Line 15 (Approx.): In Claim 18, delete "$prf_5((T^{\theta+x_M} \cdot W)^\theta),$" and insert -- $prf_5((T^{x+x_M} \cdot W)^\theta),$ --

Column 24, Line 10: In Claim 29, delete "and" and insert --, and --

Column 24, Line 11: In Claim 29, delete "su per" and insert -- super --

Column 24, Line 12: In Claim 29, delete "respectively" and insert -- respectively, --

Column 24, Line 17: In Claim 29, delete "$\kappa_i$" and insert -- $\kappa_I$ --

Column 24, Line 22: In Claim 29, after "defining" insert -- key --

Column 24, Line 31: In Claim 29, after "super" insert -- block --

Column 25, Line 27: In Claim 38, delete "w," and insert -- $\psi$, --

Column 25, Line 51: In Claim 42, delete "$\kappa_i$" and insert -- $\kappa_I$ --